(12) United States Patent
Purcell

(10) Patent No.: US 7,275,112 B1
(45) Date of Patent: Sep. 25, 2007

(54) EFFICIENT SERIALIZATION OF BURSTY OUT-OF-ORDER RESULTS

(75) Inventor: Stephen Clark Purcell, Mountain View, CA (US)

(73) Assignee: Pasternak Solutions LLC, Los Altos, CA (US)

( * ) Notice: Subject to any disclaimer, the term of this patent is extended or adjusted under 35 U.S.C. 154(b) by 331 days.

(21) Appl. No.: 09/925,159

(22) Filed: Aug. 8, 2001

(51) Int. Cl.
*G06F 15/167* (2006.01)
*G06F 9/54* (2006.01)
*G06F 12/00* (2006.01)
*G06F 13/00* (2006.01)
*G06F 13/28* (2006.01)

(52) U.S. Cl. ............... 709/244; 709/202; 719/314; 718/103; 711/100; 711/150; 711/151; 711/168

(58) Field of Classification Search ........ 719/300–332; 709/200–253; 718/103; 711/100–168
See application file for complete search history.

(56) References Cited

U.S. PATENT DOCUMENTS

| 5,276,899 | A | * | 1/1994 | Neches | 709/240 |
|---|---|---|---|---|---|
| 5,608,870 | A | * | 3/1997 | Valiant | 711/100 |
| 6,105,147 | A | * | 8/2000 | Molloy | 714/16 |
| 6,161,169 | A | * | 12/2000 | Cheng | 711/150 |
| 6,385,700 | B2 | * | 5/2002 | Johnson | 711/140 |
| 6,405,286 | B2 | * | 6/2002 | Gupta et al. | 711/127 |
| 6,820,148 | B1 | * | 11/2004 | Cedar et al. | 710/104 |

* cited by examiner

*Primary Examiner*—Lewis A. Bullock, Jr.
(74) *Attorney, Agent, or Firm*—McDonnell Boehnen Hulbert & Berghoff LLP

(57) ABSTRACT

A method, apparatus, and computer program product includes serially receiving, from a source, a plurality of forward messages each addressed to one of a plurality of destinations; receiving a plurality of availability signals, each availability signal indicating that one of the destinations is available to accept a forward message; simultaneously sending a forward message to each available destination; simultaneously receiving, after a predetermined period of time, a plurality of reverse messages from the destinations, each reverse message corresponding to one of the forward messages simultaneously sent to an available destination; and serially sending the reverse messages to the source.

14 Claims, 17 Drawing Sheets

EFFICIENT SERIALIZATION OF BURSTY OUT-OF-ORDER RESULTS

BACKGROUND

The present invention relates generally to interconnection architecture, and particularly to interconnecting multiple processors with multiple shared memories.

Advances in the area of computer graphics algorithms have led to the ability to create realistic and complex images, scenes and films using sophisticated techniques such as ray tracing and rendering. However, many complex calculations must be executed when creating realistic or complex images. Some images may take days to compute even when using a computer with a fast processor and large memory banks. Multiple processor systems have been developed in an effort to speed up the generation of complex and realistic images. Because graphics calculations tend to be memory intensive applications, some multiple processor graphics systems are outfitted with multiple, shared memory banks. Ideally, a multiple processor, multiple memory bank system would have full, fast interconnection between the memory banks and processors. For systems with a limited number of processors and memory banks, a crossbar switch is an excellent choice for providing fast, full interconnection without introducing bottlenecks.

However, while graphics processors generally provide a more or less steady serial stream of memory transactions, shared memory generally accepts memory transactions in a burst fashion, such that several memory transactions can be sent in parallel to the shared memory. Conventional crossbar architectures do not take advantage of this burstiness.

SUMMARY

In general, in one aspect, the invention features a method, apparatus, and computer program product. It includes serially receiving, from a source, a plurality of forward messages each addressed to one of a plurality of destinations; receiving a plurality of availability signals, each availability signal indicating that one of the destinations is available to accept a forward message; simultaneously sending a forward message to each available destination; simultaneously receiving, after a predetermined period of time, a plurality of reverse messages from the destinations, each reverse message corresponding to one of the forward messages simultaneously sent to an available destination; and serially sending the reverse messages to the source.

Particular implementations can include one or more of the following features. The source identifies each of the forward messages by a different tag, and implementations include placing a tag in a delay buffer when sending to a destination the forward message identified by that tag, wherein the delay buffer implements a delay equal to the predetermined period of time such that the tag is available when receiving from memory the reverse message corresponding to the forward message; and sending the tag to the source with the reverse message, whereby the source associates the reverse message with the forward message. Implementations include associating a priority with each forward message; and sending a forward message to a destination when that forward message has a higher priority than other forward messages addressed to that destination. The priority of each forward message represents an age of that forward message. Implementations include associating a priority with each reverse message; and sending a forward message to the source when that reverse message has a higher priority than other reverse messages. The priority of each reverse message represents an age of that reverse message. Each destination is a memory bank, each forward message is a memory transaction, and each reverse message is the result of one of the memory transactions.

Advantages that can be seen in implementations of the invention include one or more of the following. The disclosed architectures provide an efficient interface between a graphics processor's steady supply of memory transactions and a shared memory's bursty demand for memory transactions.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
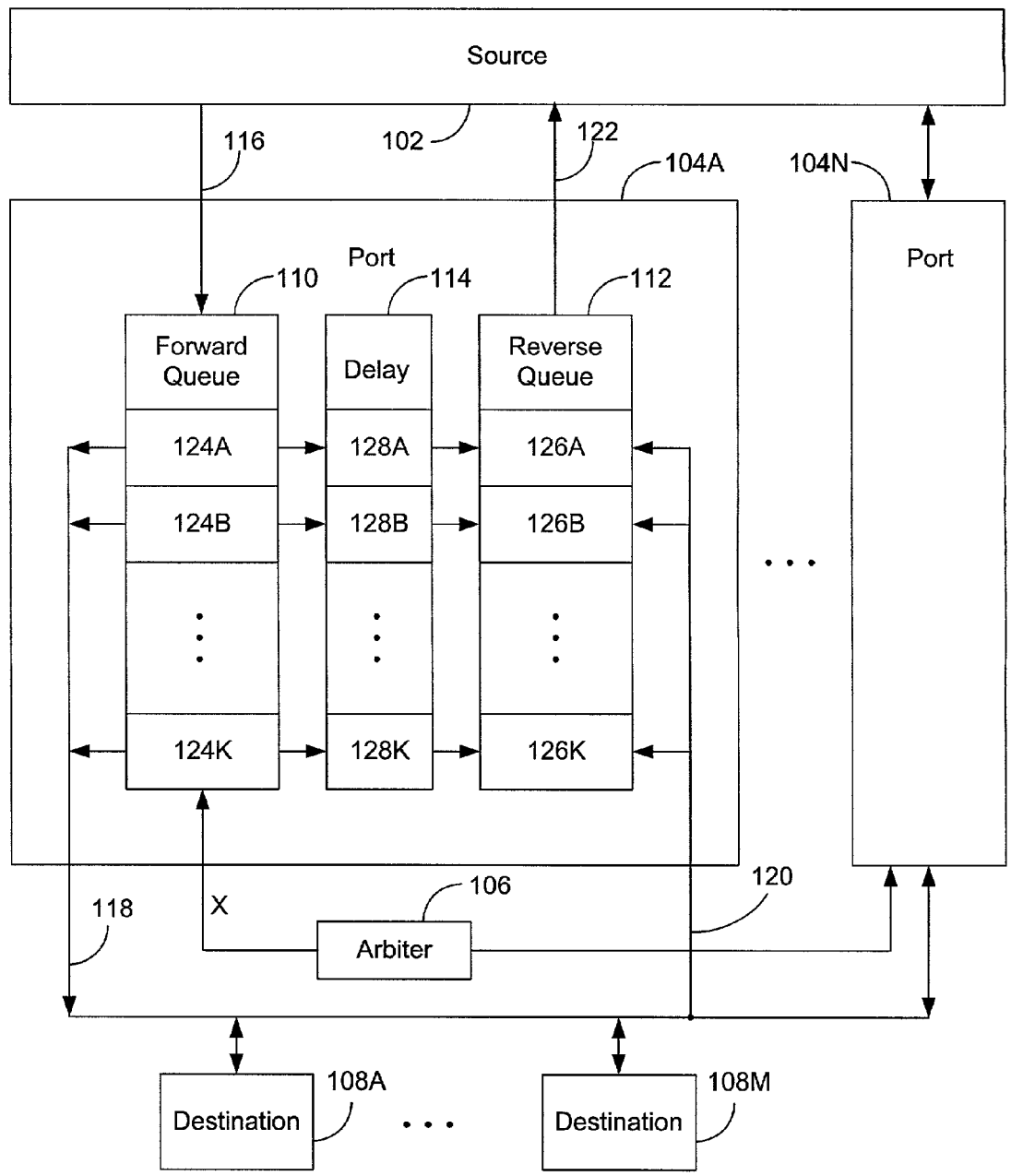
FIG. 1 is a block diagram of one implementation of the present invention.

FIG. 1 is a block diagram of one implementation of the present invention. A plurality of ports 104A through 104N relay messages between a source 102 and a plurality of destinations 108. The messages relayed from source 102 to destinations 108 are referred to as "forward messages,"

while the messages relayed from destinations 108 to source 102 are referred to as "reverse messages." Each forward message is addressed to one of destinations 108.

There is a one-to-one correspondence between forward and reverse messages. That is, each forward message delivered to a destination 108 causes a reverse message to be generated by that destination. Corresponding forward and reverse messages traverse the same port 104.

Each port includes a forward queue 110, a reverse queue 112, and a delay element 114. Forward queue 110 includes a plurality of forward registers 124A and 124B through 124K. Forward queue 110 receives forward messages from source 102 serially over a bus 116. That is, forward queue 110 receives only one forward message at a time from source 102. Forward queue 110 sends the forward messages to destinations 108 in parallel over a bus 118. That is, forward queue can send multiple forward messages to destinations 108 simultaneously.

Reverse queue 112 includes a plurality of reverse registers 126A and 126B through 126K. Reverse queue 112 receives reverse messages in parallel over a bus 120. That is, reverse queue 112 can receive multiple reverse messages from destinations 108 simultaneously. Reverse queue sends reverse messages to source 102 serially over a bus 122. That is, reverse queue sends only one forward message at a time to source 102.

Delay element 114 includes a plurality of delay buffers 128A and 128B through 128K. When a forward register 124, such as forward register 124B, sends a forward message to a destination 108, that forward register also places a flag in a corresponding delay buffer 128B. After a known predetermined time, a reverse message corresponding to that forward message arrives in the reverse register 126B corresponding to that delay buffer 128B. Each delay buffer implements a delay equivalent to the known predetermined time. Therefore delay buffer 128B places the flag in the reverse register 126B simultaneously with the arrival of the reverse message in that reverse register 126B.

In one implementation the flag includes a validity bit that indicates whether a forward register 124 or a reverse register 126 contains a valid message. According to that implementation, the forward and reverse queues send only messages for which the validity bit indicates a valid message.

Each destination 108 has limited availability. For example, each destination can be a memory bank that is sometimes available to accept messages, and sometimes busy and therefore unavailable. An arbiter 106 tracks the availability of each destination 108 and informs each port of the availability of destinations 108 by means of a signal X. For clarity only one signal X is shown in FIG. 1. In one implementation, arbiter 106 sends a different signal X to each forward register 124 in forward queue 110. Each signal X informs a forward register 124 of the availability of the destination addressed by the forward message in that forward register 124.

Figure 2:
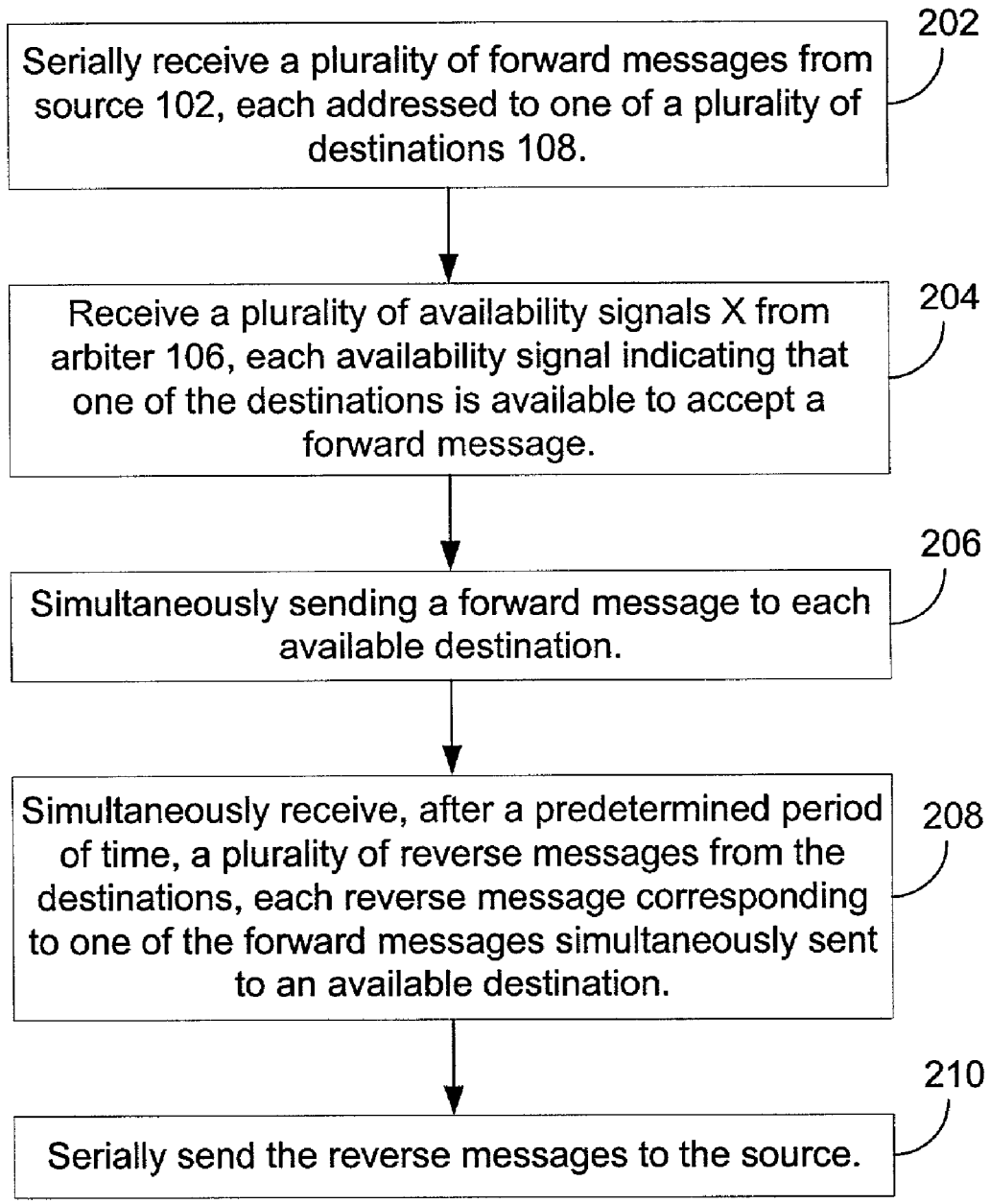
FIG. 2 is a flowchart depicting an operation of a port according to one implementation.

FIG. 2 is a flowchart depicting an operation of port 104 according to one implementation. Port 104 serially receives a plurality of forward messages from source 102, each addressed to one of a plurality of destinations 108 (step 202). Port 104 places each forward message in one of forward registers 124 and sets the validity bit for each of the received forward messages.

Port 104 receives a plurality of availability signals X from arbiter 106 (step 204). Each availability signal indicating that one of the destinations is available to accept a forward message. In one implementation, each availability signal causes one of forward registers 124 to send its forward message to the destination addressed by that forward message. In one implementation, each availability signal causes one of forward registers 124 to place its validity bit in a corresponding one of delay buffers 114.

Port 104 simultaneously sends a forward message to each available destination addressed by one of the forward messages in forward queue 110 (step 206). If more than one forward message in forward queue 110 is addressed to the same available destination, then arbiter 106 selects one of those forward messages to be sent to that destination. In one implementation, arbiter 106 selects a forward message based on the ages of the forward messages. In addition, port 104 places the validity bit for each forward register 124 into the delay buffer 128 corresponding to that forward register 124. Port 104 then clears the validity bit for each of those forward registers 124 from which a forward message was sent.

When a forward message is sent from a forward register 124, that register 124 is available to accept another forward message. In one implementation, forward messages progress through forward queue 110, from forward register 124A to forward register 124K, until sent to a destination 108. In this implementation the approximate age of a forward message is given by the identity of the forward register 124 in which that forward message resides.

After the predetermined period of time, port 104 simultaneously receives a plurality of reverse messages from the destinations 108 (step 208). Each reverse message corresponds to one of the forward messages sent during step 206. Each reverse message is placed in the reverse register 126 corresponding to the forward register 124 from which the corresponding forward message was sent. At the same time, each delay buffer 128 corresponding to a reverse register that received a reverse message in step 208 places the validity bit for the forward message corresponding to that reverse message in that reverse register.

Port 104 then serially sends the reverse messages in reverse queue 112 to source 102 (step 210). When a reverse message is sent from a reverse register 126, that register 126 is available to accept another reverse message. In one implementation, reverse messages progress through reverse queue 112, from reverse register 126A to reverse register 126K, until sent to source 102. In this implementation the approximate age of a reverse message is given by the identity of the reverse register 112 in which that reverse message resides.

If more that one reverse register 126 contains a valid reverse message ready to be sent to source 102, then an arbitration scheme is used to select which reverse message is sent. In one implementation, the reverse message to be sent is selected based on the ages of the reverse messages.

Architecture Overview

Figure 3:
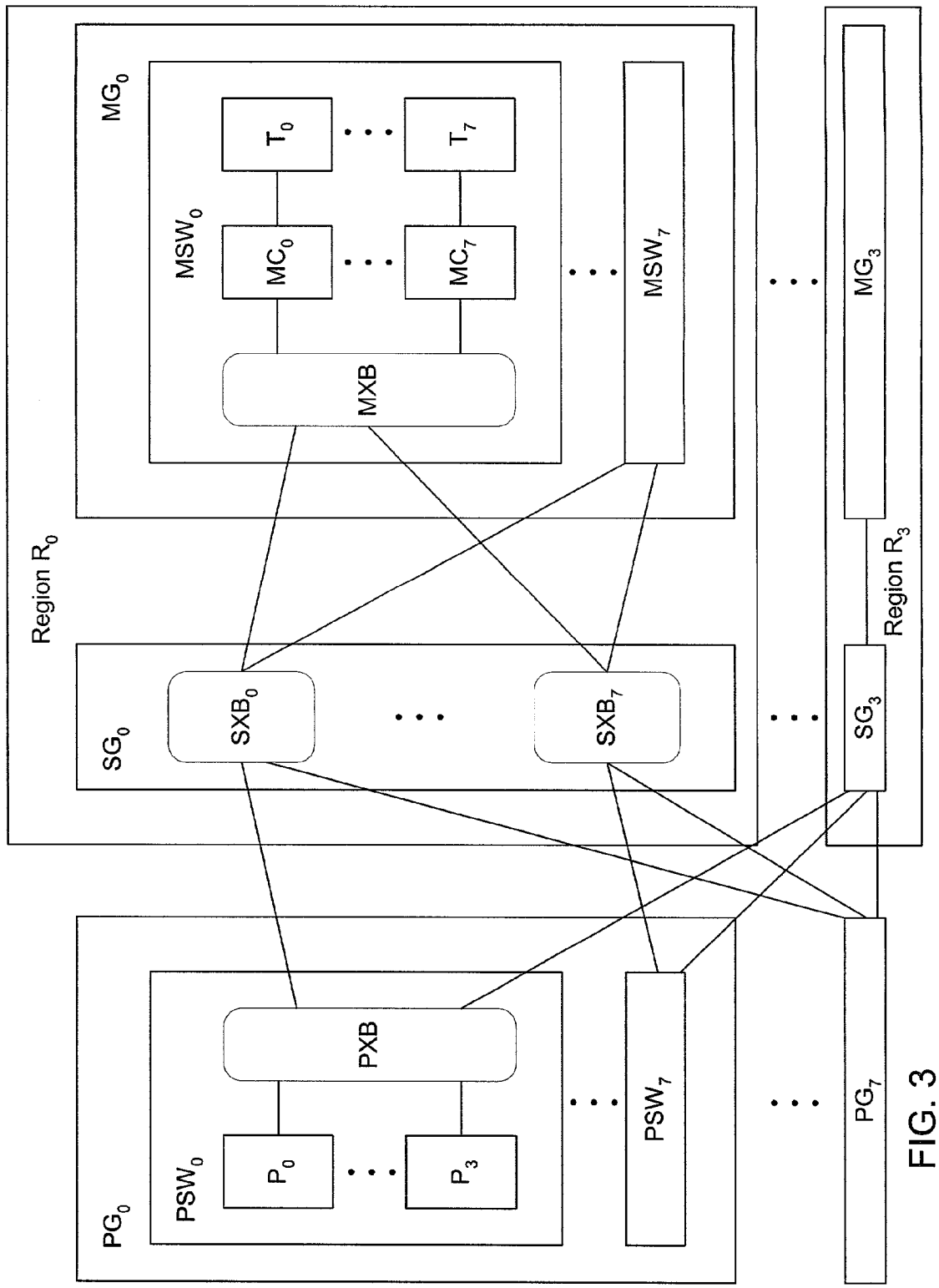
FIG. 3 illustrates an apparatus with which implementations of the present invention are useful.

FIG. 3 illustrates an apparatus with which implementations of the present invention are useful. As shown in FIG. 3, a plurality of processor groups $PG_0$ through $PG_7$ is connected to a plurality of regions $R_0$ through $R_3$. Each region R includes a memory group MG connected to a switch group SG. For example, region $R_0$ includes a memory group $MG_0$ connected to a switch group $SG_0$, while region $R_3$ includes a memory group $MG_3$ connected to a switch group $SG_3$.

Each processor group PG includes a plurality of processor switches $PSW_0$ through $PSW_7$. Each processor switch PSW includes a plurality of processors $P_0$ through $P_3$. Each processor P is connected to a processor crossbar PXB. In one implementation, each of processors $P_0$ through $P_3$ performs a different graphics rendering function. In one implementation, $P_0$ is a triangle processor, $P_1$ is a triangle intersector, $P_2$ is a ray processor, and $P_3$ is a grid processor.

Each switch group SG includes a plurality of switch crossbars $SXB_0$ through $SXB_7$. Each processor crossbar PXB is connected to one switch crossbar SXB in each switch group SG. Each switch crossbar SXB in a switch group SG is connected to a different processor crossbar PXB in a processor group PG. For example, the processor crossbar PXB in processor switch $PSW_0$ is connected to switch crossbar $SXB_0$ in switch group $SG_0$, while the processor crossbar in processor switch $PSW_7$ is connected to switch crossbar $SXB_7$ in switch group $SG_0$.

Each memory switch MSW includes a plurality of memory controllers $MC_0$ through $MC_7$. Each memory controller MC is connected to a memory crossbar MXB by an internal bus. Each memory controller MC is also connected to one of a plurality of memory tracks $T_0$ through $T_7$. Each memory track T includes a plurality of memory banks. Each memory track T can be implemented as a conventional memory device such as a SDRAM.

Each memory group MG is connected to one switch group SG. In particular, each memory crossbar MXB in a memory group MG is connected to every switch crossbar SXB in the corresponding switch group SG.

Processor crossbars PXB provide full crossbar interconnection between processors P and switch crossbars SXB. Memory crossbars MXB provide full crossbar interconnection between memory controllers MC and switch crossbars SXB. Switch crossbars SXB provide full crossbar interconnection between processor crossbars PXB and memory crossbars MXB.

In one implementation, each of processor switches PSW, memory switches MSW and switch crossbars SXB is fabricated as a separate semiconductor chip. In one implementation, each processor switch PSW is fabricated as a single semiconductor ship, each switch crossbar SXB is fabricated as two or more semiconductor chips that operate in parallel, each memory crossbar MXB is fabricated as two or more semiconductor chips that operate in parallel, and each memory track T is fabricated as a single semiconductor chip. One advantage of each of these implementations is that the number of off-chop interconnects is minimized. Such implementations are disclosed in two copending patent applications entitled "SLICED CROSSBAR ARCHITECTURE WITH INTER-SLICE COMMUNICATION," now U.S. Pat. No. 6,970,451 and "SLICED CROSSBAR ARCHITECTURE WITH NO INTER-SLICE COMMUNICATION," now U.S. Pat. No. 6,931,803

Figure 4:
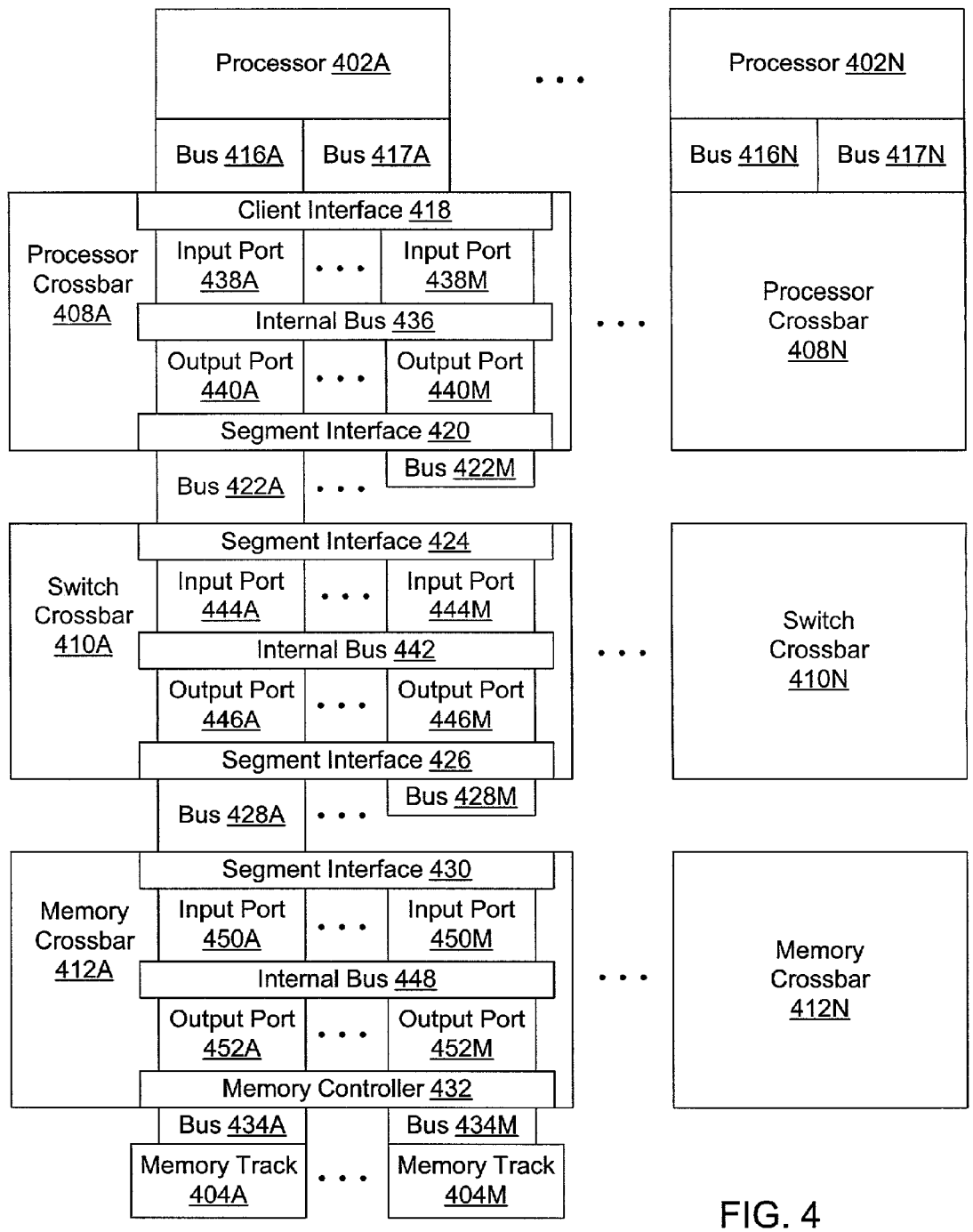
FIG. 4 shows a plurality of processors coupled to a plurality of memory tracks by a switch having three layers according to one implementation: a processor crossbar layer, a switch crossbar layer, and a memory crossbar layer.

Referring to FIG. 4, a plurality of processors 402A through 402N is coupled to a plurality of memory tracks 404A through 404M by a switch having three layers: a processor crossbar layer, a switch crossbar layer, and a memory crossbar layer. The processor crossbar layer includes a plurality of processor crossbars 408A through 408N. The switch crossbar layer includes a plurality of switch crossbars 410A through 410N. The memory crossbar layer includes a plurality of memory crossbars 412A through 412N. In one implementation, N=64. In other implementations, N takes on other values, and can take on different values for each type of crossbar.

Each processor 402 is coupled by a pair of busses 416 and 417 to one of the processor crossbars 408. For example, processor 402A is coupled by busses 416A and 417A to processor crossbar 408A. In a similar manner, processor 402N is coupled by busses 416N and 417N to processor crossbar 408N. In one implementation, each of busses 416 and 417 includes many point-to-point connections.

Each processor crossbar 408 includes a plurality of input ports 438A through 438M, each coupled to a bus 416 or 417 by a client interface 418. For example, client interface 418 couples input port 438A in processor crossbar 408A to bus 416A, and couples input port 438M in processor crossbar 408A to bus 417A. In one implementation, M=8. In other implementations, M takes on other values, and can take on different values for each type of port, and can differ from crossbar to crossbar.

Each processor crossbar 408 also includes a plurality of output ports 440A through 440M. Each of the input ports 438 and output ports 440 are coupled to an internal bus 436. In one implementation, each bus 436 includes many point-to-point connections. Each output port 440 is coupled by a segment interface 420 to one of a plurality of busses 422A through 422M. For example, output port 440A is coupled by segment interface 420 to bus 422A. Each bus 422 couples processor crossbar 408A to a different switch crossbar 410. For example, bus 422A couples processor crossbar 408A to switch crossbar 410A. In one implementation, busses 422 include many point-to-point connections.

Each switch crossbar 410 includes a plurality of input ports 444A through 444M, each coupled to a bus 422 by a segment interface 424. For example, input port 444A in switch crossbar 410A is coupled to bus 422A by segment interface 424.

Each switch crossbar 410 also includes a plurality of output ports 446A through 446M. Each of the input ports 444 and output ports 446 are coupled to an internal bus 442. In one implementation, each bus 442 includes many point-to-point connections. Each output port 446 is coupled by a segment interface 426 to one of a plurality of busses 428A through 428M. For example, output port 446A is coupled by segment interface 426 to bus 428A. Each bus 428 couples switch crossbar 410A to a different memory crossbar 412. For example, bus 428A couples switch crossbar 410A to memory crossbar 412A. In one implementation, each of busses 428 includes many point-to-point connections.

Each memory crossbar 412 includes a plurality of input ports 450A through 450M, each coupled to a bus 428 by a segment interface 430. For example, input port 450A in memory crossbar 412A is coupled to bus 428A by segment interface 430.

Each memory crossbar 412 also includes a plurality of output ports 452A through 452M. Each of the input ports 450 and output ports 452 are coupled to an internal bus 448. In one implementation, each bus 448 includes many point-to-point connections. Each output port 452 is coupled by a memory controller 432 to one of a plurality of busses 434A through 434M. For example, output port 452A is coupled by memory controller 432 to bus 434A. Each of busses 434A through 434M couples memory crossbar 412A to a different one of memory tracks 404A through 404M. Each memory track 404 includes one or more synchronous dynamic random access memories (SDRAMs), as discussed below. In one implementation, each of busses 434 includes many point-to-point connections.

In one implementation, each of busses 416, 417, 422, 428, and 434 is a high-speed serial bus where each transaction can include one or more clock cycles. In another implementation, each of busses 416, 417, 422, 428, and 434 is a parallel bus. Conventional flow control techniques can be implemented across each of busses 416, 422, 428, and 434. For example, each of client interface 418, memory controller 432, and segment interfaces 420, 424, 426, and 430 can include buffers and flow control signaling according to conventional techniques.

In one implementation, each crossbar 408, 410, 412 is implemented as a separate semiconductor chip. In one implementation, processor crossbar 408 and processor 402 are implemented together as a single semiconductor chip. In one implementation, each of switch crossbar 410 and memory crossbar 412 is implemented as two or more chips that operate in parallel, as described below.

Processor

Figure 5:
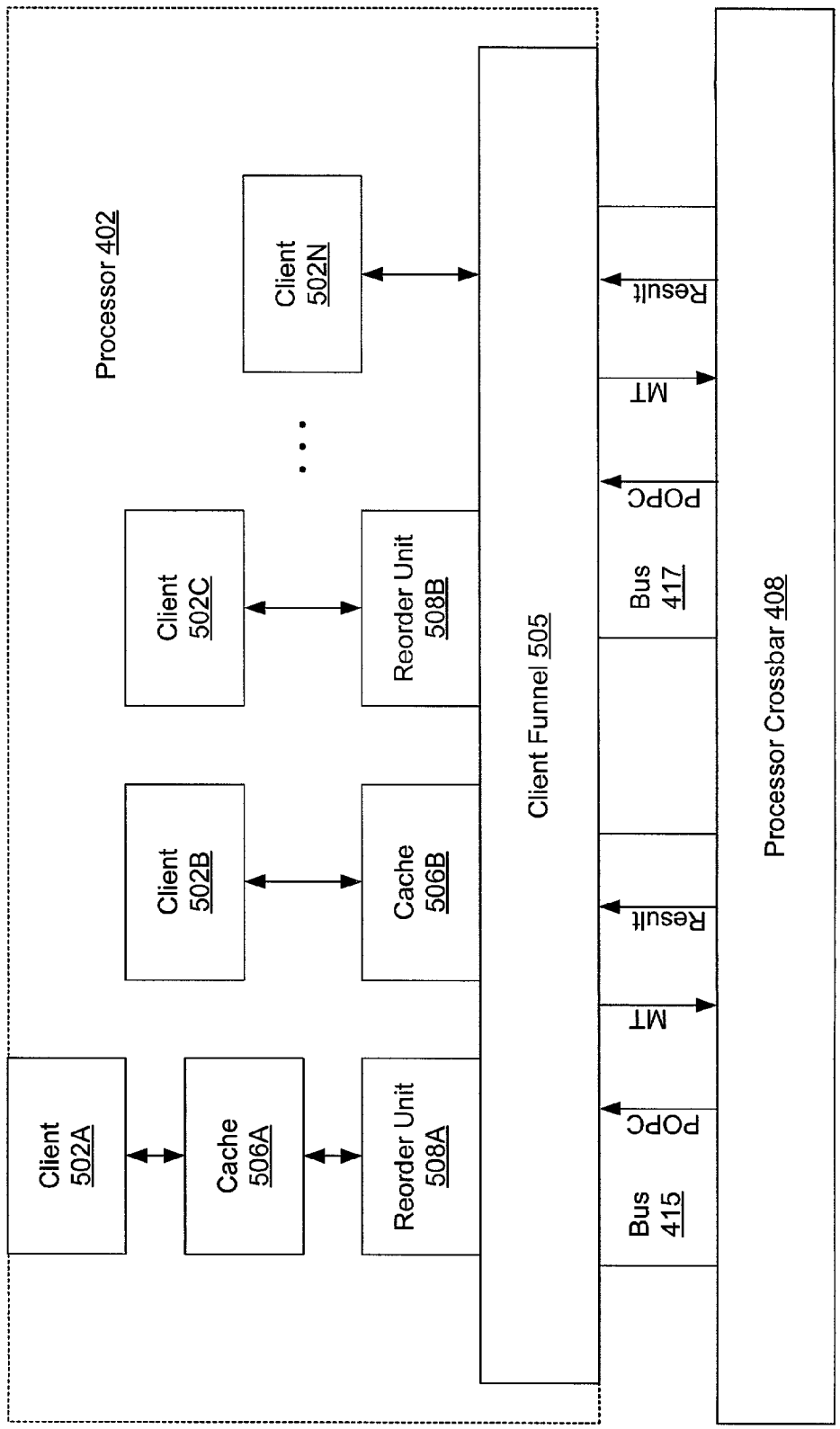
FIG. 5 shows a processor that includes a plurality of clients and a client funnel according to one implementation.

Referring to FIG. 5, in one implementation processor 402 includes a plurality of clients 502 and a client funnel 504. Each client 502 can couple directly to client funnel 504 or through one or both of a cache 506 and a reorder unit 508. For example, client 502A is coupled to cache 506A, which is coupled to reorder unit 508A, which couples to client funnel 504. As another example, client 502B is coupled to cache 506B, which couples to client funnel 504. As another example, client 502C couples to reorder unit 508B, which couples to client funnel 504. As another example, client 502N couples directly to client funnel 504.

Clients 502 manage memory requests from processes executing within processor 402. Clients 502 collect memory transactions (MT) destined for memory. If a memory transaction cannot be satisfied by a cache 506, the memory transaction is sent to memory. Results of memory transactions (Result) may return to client funnel 504 out of order. Reorder unit 508 arranges the results in order before passing them to a client 502.

Each input port 438 within processor crossbar 408 asserts a POPC signal when that input port 438 can accept a memory transaction. In response, client funnel 504 sends a memory transaction to that input port 438 if client funnel 504 has any memory transactions destined for that input port 438.

Processor Crossbar

Figure 6:
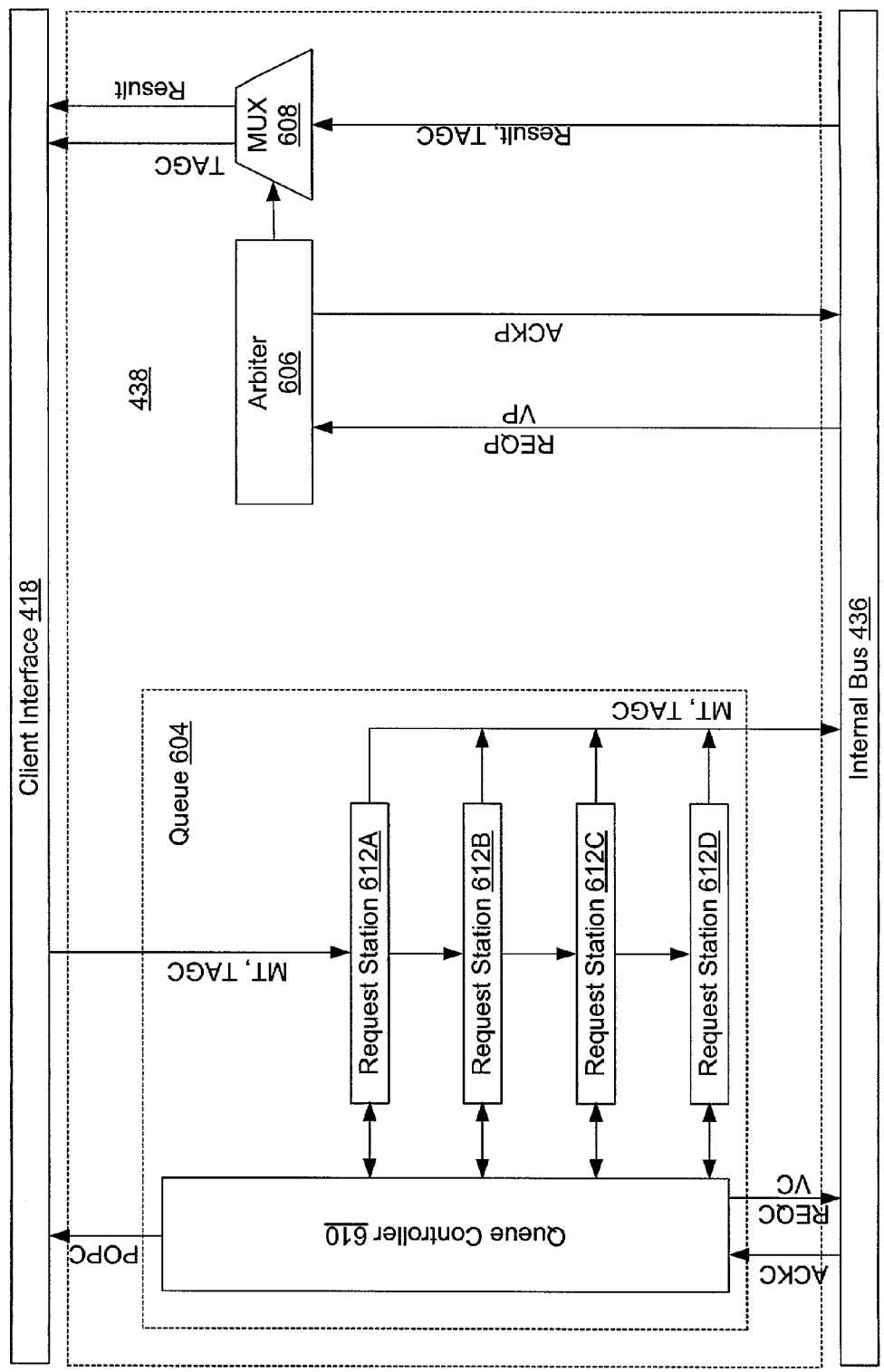
FIG. 6 shows an input port within a processor crossbar according to one implementation.

Referring to FIG. 6, an input port 438 within processor crossbar 408 includes a client interface 418, a queue 604, an arbiter 606, and a multiplexer (MUX) 608. Client interface 418 and arbiter 606 can be implemented using conventional Boolean logic devices.

Queue 604 includes a queue controller 610 and four request stations 612A, 612B, 612C, and 612D. In one implementation, request stations 612 are implemented as registers. In another implementation, request stations 612 are signal nodes separated by delay elements. Queue controller 610 can be implemented using conventional Boolean logic devices.

Now an example operation of input port 438 in passing a memory transaction from processor 402 to switch crossbar 410 will be described with reference to FIG. 6. For clarity it is assumed that all four of request stations 612 are valid. A request station 612 is valid when it currently stores a memory transaction that has not been sent to switch crossbar 410, and a TAGC produced by client funnel 504.

Internal bus 436 includes 64 data busses including 32 forward data busses and 32 reverse data busses. Each request station 612 in each input port 438 is coupled to a different one of the 32 forward data busses. In this way, the contents of all of the request stations 612 are presented on internal bus 436 simultaneously.

Each memory transaction includes a command and a memory address. Some memory transactions, such as write transactions, also include data. For each memory transaction, queue controller 610 asserts a request REQC for one of output ports 440 based on a portion of the address in that memory transaction. Queue controller 610 also asserts a valid signal VC for each request station 612 that currently stores a memory transaction ready for transmission to switch crossbar 410.

Each output port 440 chooses zero or one of the request stations 612 and transmits the memory transaction in that request station to switch crossbar 410, as described below. That output port 440 asserts a signal ACKC that tells the input port 438 which request station 612 was chosen. If one of the request stations 612 within input port 438 was chosen, queue controller 610 receives an ACKC signal. The ACKC signal indicates one of the request stations 612.

The request stations 612 within a queue 604 operate together substantially as a buffer. New memory transactions from processor 402 enter at request station 612A and progress towards request station 612D as they age until chosen by an output port. For example, if an output port 440 chooses request station 612B, then request station 612B becomes invalid and therefore available for a memory transaction from processor 402. However, rather than placing a new memory transaction in request station 612B, queue controller 610 moves the contents of request station 612A into request station 612B and places the new memory transaction in request station 612A. In this way, the identity of a request station serves as an approximate indicator of the age of the memory transaction. In one implementation, only one new memory transaction can arrive during each transaction time, and each memory transaction can age by only one request station during each transaction time. Each transaction time can include one or more clock cycles. In other implementations, age is computed in other ways.

When queue controller 610 receives an ACKC signal, it takes three actions. Queue controller 610 moves the contents of the "younger" request stations 612 forward, as described above, changes the status of any empty request stations 612 to invalid by disasserting VC, and sends a POPC signal to client interface 418. Client interface segment 418 forwards the POPC signal across bus 416 to client funnel 504, thereby indicating that input port 438 can accept a new memory transaction from client funnel 504.

In response, client funnel 504 sends a new memory transaction to the client interface 418 of that input port 438. Client funnel 504 also sends a tag TAGC that identifies the client 502 within processor 402 that generated the memory transaction.

Queue controller 610 stores the new memory transaction and the TAGC in request station 612A, and asserts signals VC and REQC for request station 612A. Signal VC indicates that request station 612A now has a memory transaction ready for transmission to switch crossbar 410. Signal REQC indicates through which output port 440 the memory transaction should pass.

Figure 7:
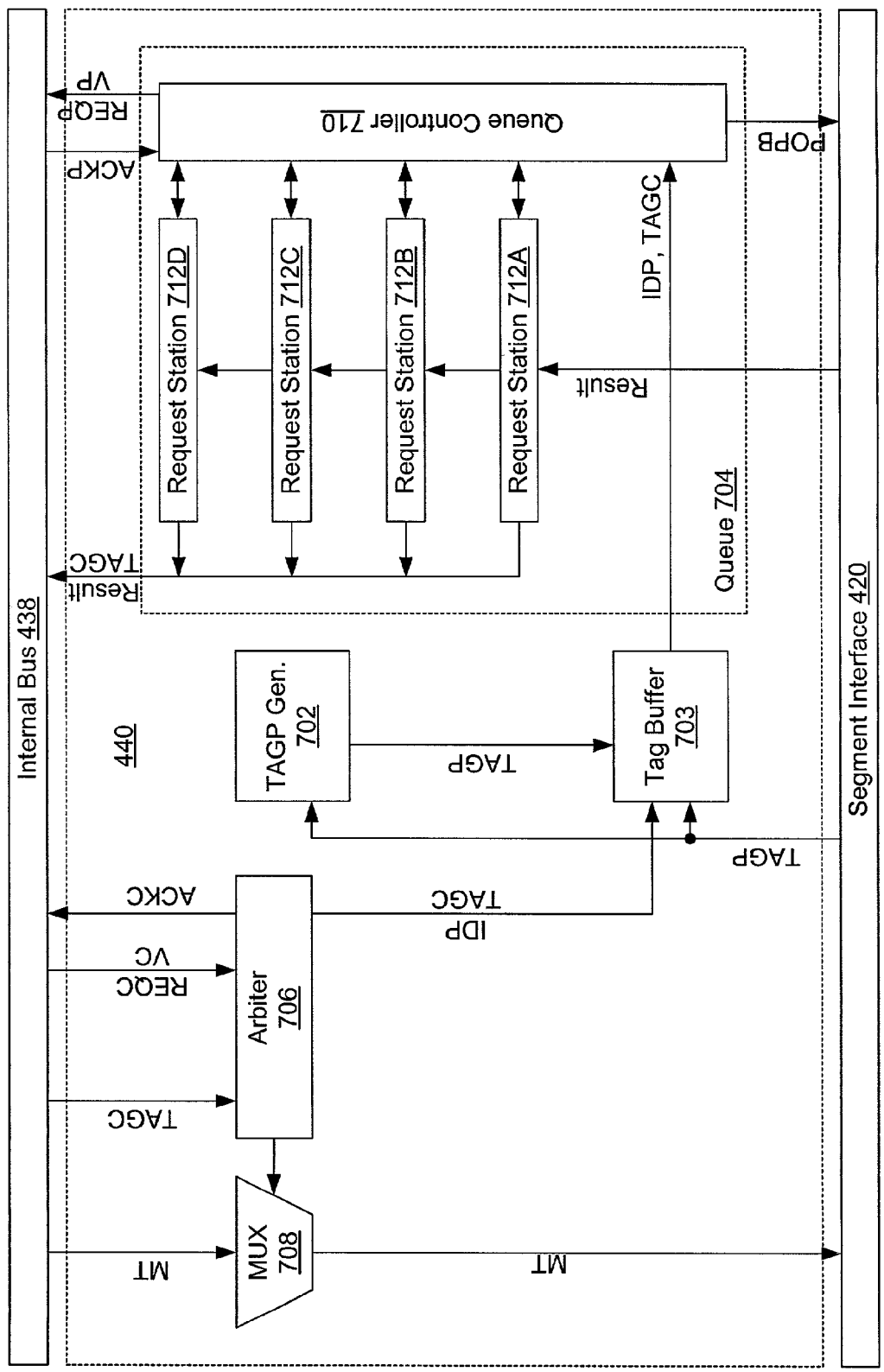
FIG. 7 shows an output port within a processor crossbar according to one implementation.

Referring to FIG. 7, an output port 440 within processor crossbar 408 includes a segment interface 420, a TAGP generator 702, a tag buffer 703, a queue 704, an arbiter 706, and a multiplexer 708. Tag generator 702 can be implemented as described below. Segment interface 420 and arbiter 706 can be implemented using conventional Boolean logic devices. Tag buffer 703 can be implemented as a conventional buffer.

Queue 704 includes a queue controller 710 and four request stations 712A, 712B, 712C, and 712D. In one implementation, request stations 712 are implemented as registers. In another implementation, request stations 712 are signal nodes separated by delay elements. Queue controller 710 can be implemented using conventional Boolean logic devices.

Now an example operation of output port 440 in passing a memory transaction from an input port 438 to switch crossbar 410 will be described with reference to FIG. 7. Arbiter 706 receives a REQC signal and a VC signal indicating that a particular request station 612 within an input port 438 has a memory transaction ready for transmission to switch crossbar 410. The REQC signal identifies the request station 612, and therefore, the approximate age of the memory transaction within that request station 612. The VC signal indicates that the memory transaction within that request station 612 is valid. In general, arbiter 706 receives such signals from multiple request stations 612 and chooses the oldest request station 612 for transmission.

Arbiter 706 causes multiplexer 708 to gate the memory transaction (MT) within the chosen request station 612 to segment interface 420. Arbiter 706 generates a signal IDP that identifies the input port 438 within which the chosen request station 612 resides. The identity of that input port 438 is derived from the REQC signal.

Tag generator 702 generates a tag TAGP according to the methods described below. Arbiter 706 receives the TAGC associated with the memory transaction. The IDP, TAGC, and TAGP are stored in tag buffer 703. In one implementation, any address information within the memory transaction that is no longer needed (that is, the address information that routed the memory transaction to output port 440) is discarded. In another implementation that address information is passed with the memory transaction to switch crossbar 410. Arbiter 706 asserts an ACKC signal that tells the input port 438 containing the chosen request station 612 that the memory transaction in that request station has been transmitted to switch crossbar 410.

Now an example operation of output port 440 in passing a result of a memory transaction from switch crossbar 410 to processor 402 will be described with reference to FIG. 7. For clarity it is assumed that all four of request stations 712 are valid. A request station 712 is valid when it currently stores a memory transaction that has not been sent to processor 402, and a TAGC and IDP retrieved from tag buffer 703.

As mentioned above, internal bus 436 includes 32 reverse data busses. Each request station 712 in each output port 440 is coupled to a different one of the 32 reverse data busses. In this way, the contents of all of the request stations 712 are presented on internal bus 436 simultaneously.

Some results, such as a result of a read transaction, include data. Other results, such as a result for a write transaction, include an acknowledgement but no data. For each result, queue controller 710 asserts a request REQP for one of input ports 438 based on IDP. As mentioned above, IDP indicates the input port 438 from which the memory transaction prompting the result originated. Queue controller 710 also asserts a valid signal VP for each request station 712 that currently stores a result ready for transmission to processor 402.

Each input port 438 chooses zero or one of the request stations 712 and transmits the result in that request station to processor 402, as described below. That input port 438 asserts a signal ACKP that tells the output port 440 which request station 712 within that output port was chosen. If one of the request stations 712 within output port 440 was chosen, queue controller 710 receives an ACKP signal. The ACKP signal indicates one of the request stations 712.

The request stations 712 within a queue 704 operate together substantially as a buffer. New results from processor 402 enter at request station 712A and progress towards request station 712D until chosen by an input port 438. For example, if an input port 438 chooses request station 712B, then request station 712B becomes invalid and therefore available for a new result from switch crossbar 410. However, rather than placing a new result in request station 712B, queue controller 710 moves the contents of request station 712A into request station 712B and places the new result in request station 712A. In this way, the identity of a request station 712 serves as an approximate indicator of the age of the result. In one implementation, only one new memory transaction can arrive during each transaction time, and each memory transaction can age by only one request station during each transaction time. In other implementations, age is computed in other ways.

When queue controller 710 receives an ACKP signal, it takes three actions. Queue controller 710 moves the contents of the "younger" request stations forward, as described above, changes the status of any empty request stations to invalid by disasserting VP, and sends a POPB signal to segment interface 420. segment interface 420 forwards the POPB signal across bus 422 to switch crossbar 410, thereby indicating that output port 440 can accept a new result from switch crossbar 410.

In response, switch crossbar 410 sends a new result, and a TAGP associated with that result, to the segment interface 420 of that output port 440. The generation of TAGP, and association of that TAGP with the result, are discussed below with reference to FIG. 8.

Tag buffer 703 uses the received TAGP to retrieve the IDP and TAGC associated with that TAGP. TAGP is also returned to TAGP generator 702 for use in subsequent transmissions across bus 422.

Queue controller 710 stores the new result, the TAGP, and the IDP in request station 712A, and asserts signals VP and REQP for request station 712A. Signal VP indicates that request station 712A now has a result ready for transmission to processor 402. Signal REQP indicates through which input port 438 the result should pass.

Now an example operation of input port 438 in passing a result from an output port 440 to processor 402 will be described with reference to FIG. 7. Arbiter 606 receives a REQP signal and a VP signal indicating that a particular request station 712 within an output port 440 has a result ready for transmission to processor 402. The REQP signal identifies the request station 712, and therefore, the approximate age of the result within that request station 712. The VP signal indicates that the memory transaction within that request station 712 is valid. In general, arbiter 606 receives such signals from multiple request stations 712 and chooses the oldest request station 712 for transmission.

Arbiter 606 causes multiplexer 608 to gate the result and associated TAGC to client interface 418. Arbiter 606 also asserts an ACKP signal that tells the output port 440 containing the chosen request station 712 that the result in that request station has been transmitted to processor 402.

Switch Crossbar

Figure 8:
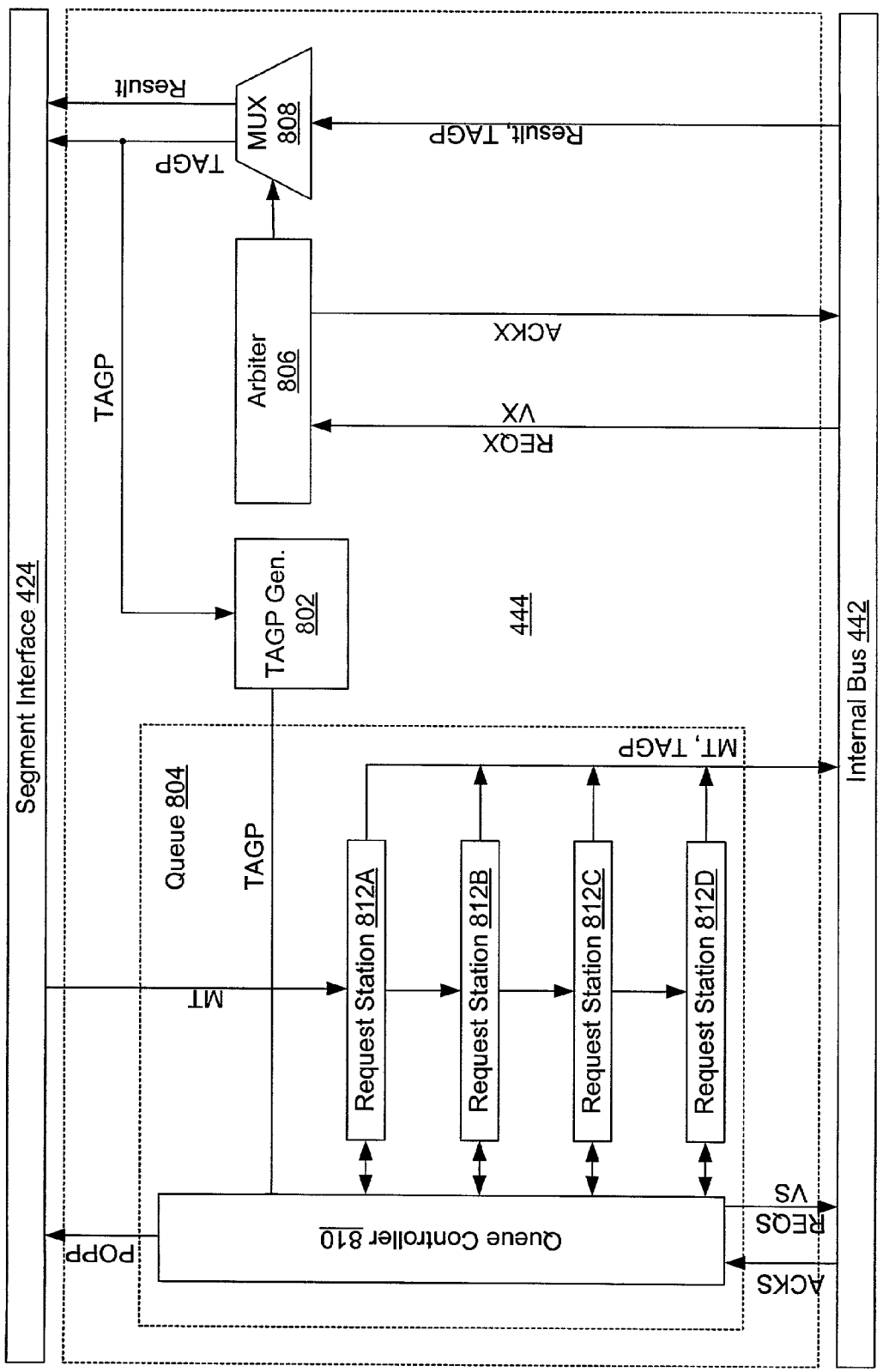
FIG. 8 shows an input port within a switch crossbar according to one implementation.

Referring to FIG. 8, an input port 444 within switch crossbar 410 includes a segment interface 424, a TAGP generator 802, a queue 804, an arbiter 806, and a multiplexer 808. TAGP generator 802 can be implemented as described below. Segment interface 424 and arbiter 806 can be implemented using conventional Boolean logic devices.

Queue 804 includes a queue controller 810 and four request stations 812A, 812B, 812C, and 812D. In one implementation, request stations 812 are implemented as registers. In another implementation, request stations 812 are signal nodes separated by delay elements. Queue controller 810 can be implemented using conventional Boolean logic devices.

Now an example operation of input port 444 in passing a memory transaction from processor crossbar 408 to memory crossbar 412 will be described with reference to FIG. 8. For clarity it is assumed that all four of request stations 812 are valid. A request station 812 is valid when it currently stores a memory transaction that has not been sent to memory crossbar 412, and a TAGP produced by TAGP generator 802.

Internal bus 442 includes 64 data busses including 32 forward data busses and 32 reverse data busses. Each request station 812 in each input port 444 is coupled to a different one of the 32 forward data busses. In this way, the contents of all of the request stations 812 are presented on internal bus 442 simultaneously.

Each memory transaction includes a command and a memory address. Some memory transactions, such as write transactions, also include data. For each memory transaction, queue controller 810 asserts a request REQS for one of output ports 446 based on a portion of the address in that memory transaction. Queue controller 810 also asserts a valid signal VS for each request station 812 that currently stores a memory transaction ready for transmission to memory crossbar 412.

Each output port 446 chooses zero or one of the request stations 812 and transmits the memory transaction in that request station to memory crossbar 412, as described below. That output port 446 asserts a signal ACKS that tells the input port 444 which request station 812 was chosen. If one of the request stations 812 within input port 444 was chosen, queue controller 810 receives an ACKS signal. The ACKS signal indicates one of the request stations 812.

The request stations 812 within a queue 804 operate together substantially as a buffer. New memory transactions from processor crossbar 408 enter at request station 812A and progress towards request station 812D as they age until chosen by an output port. For example, if an output port 446 chooses request station 812B, then request station 812B becomes invalid and therefore available for a memory transaction from processor crossbar 408. However, rather than placing a new memory transaction in request station 812B, queue controller 810 moves the contents of request station 812A into request station 812B and places the new memory transaction in request station 812A. In this way, the identity of a request station serves as an approximate indicator of the age of the memory transaction. In one implementation, only one new memory transaction can arrive during each transaction time, and each memory transaction can age by only one request station during each transaction time. In other implementations, age is computed in other ways.

When queue controller 810 receives an ACKS signal, it takes three actions. Queue controller 810 moves the contents of the "younger" request stations 812 forward, as described above, changes the status of any empty request stations 812 to invalid by disasserting VS, and sends a POPP signal to segment interface 424. Segment interface 424 forwards the POPP signal across bus 422 to processor crossbar 408, thereby indicating that input port 444 can accept a new memory transaction from processor crossbar 408.

In response, processor crossbar 408 sends a new memory transaction to the segment interface 424 of that input port 444. TAGP generator 802 generates a TAGP for the memory transaction. Tag generators 802 and 702 are configured to independently generate the same tags in the same order, and are initialized to generate the same tags at substantially the same time, as discussed below. Therefore, the TAGP generated by TAGP generator 802 for a memory transaction has the same value as the TAGP generated for that memory transaction by TAGP generator 702. Thus the tagging technique of this implementation allows a result returned from memory tracks 404 to be matched at processor 402 with the memory transaction that produced that result.

Queue controller 810 stores the new memory transaction and the TAGP in request station 812A, and asserts signals VS and REQS for request station 812A. Signal VS indicates that request station 812A now has a memory transaction ready for transmission to memory crossbar 412. Signal REQS indicates through which output port 446 the memory transaction should pass.

Figure 9:
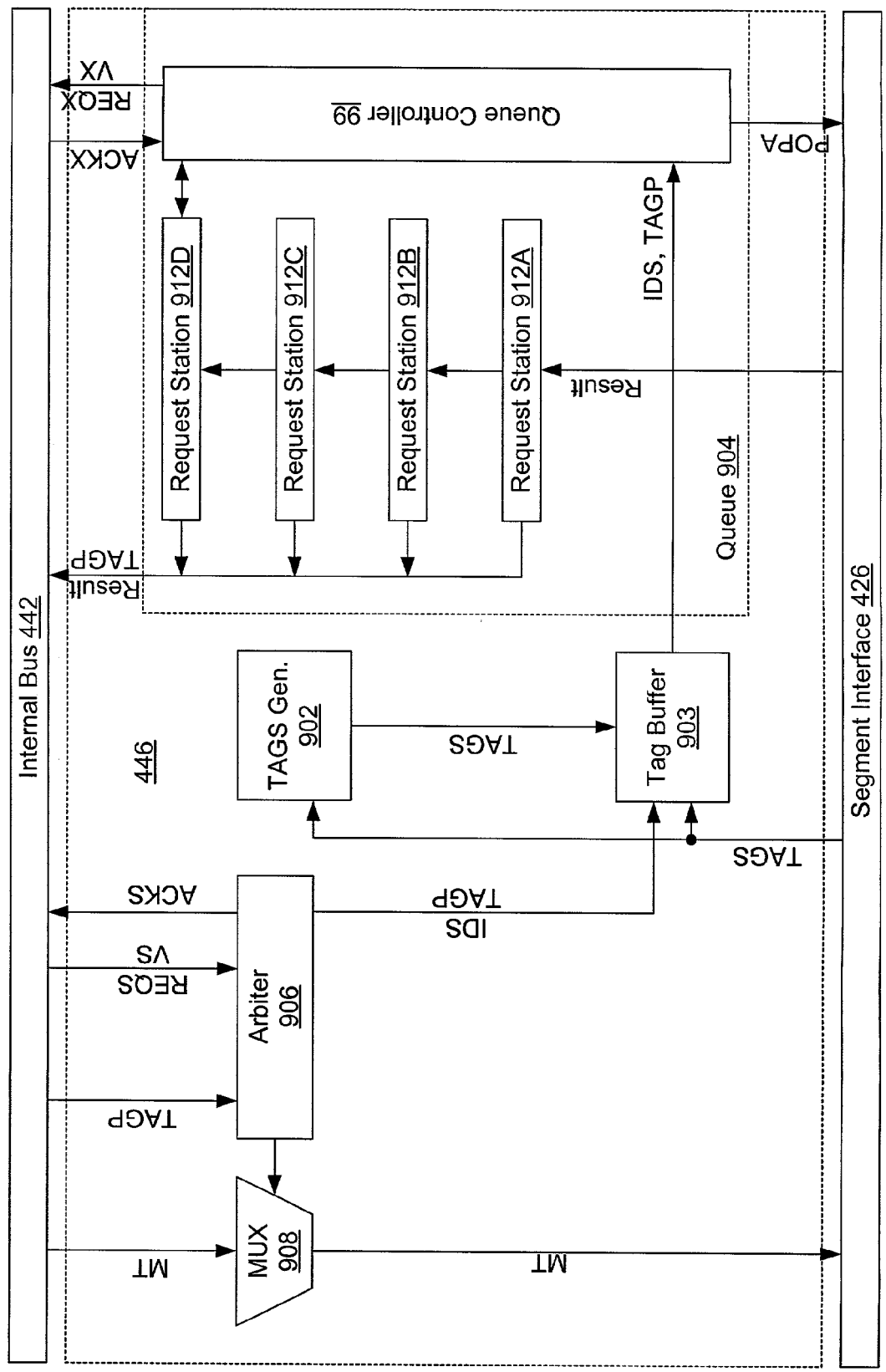
FIG. 9 shows an output port within a switch crossbar according to one implementation.

Referring to FIG. 9, an output port 446 within switch crossbar 410 includes a segment interface 426, a TAGS generator 902, a tag buffer 903, a queue 904, an arbiter 906, and a multiplexer 908. TAGS generator 902 can be implemented as described below. Segment interface 426 and arbiter 906 can be implemented using conventional Boolean logic devices. Tag buffer 903 can be implemented as a conventional buffer.

Queue 904 includes a queue controller 910 and four request stations 912A, 912B, 912C, and 912D. In one implementation, request stations 912 are implemented as registers. In another implementation, request stations 912 are signal nodes separated by delay elements. Queue controller 910 can be implemented using conventional Boolean logic devices.

Now an example operation of output port 446 in passing a memory transaction from an input port 444 to memory crossbar 412 will be described with reference to FIG. 9. Arbiter 906 receives a REQS signal and a VS signal indicating that a particular request station 812 within an input port 444 has a memory transaction ready for transmission to memory crossbar 412. The REQS signal identifies the request station 812, and therefore, the approximate age of the memory transaction within that request station 812. The VS signal indicates that the memory transaction within that request station 812 is valid. In general, arbiter 906 receives such signals from multiple request stations 812 and chooses the oldest request station 812 for transmission.

Arbiter 906 causes multiplexer 908 to gate the memory transaction (MT) within the chosen request station 812 to segment interface 426. Arbiter 906 generates a signal IDS that identifies the input port 444 within which the chosen request station 812 resides. The identity of that input port 444 is derived from the REQC signal.

TAGS generator 902 generates a tag TAGS according to the methods described below. Arbiter 906 receives the TAGP associated with the memory transaction. The IDS, TAGP, and TAGS are stored in tag buffer 903. In one implementation, any address information within the memory transaction that is no longer needed (that is, the address information that routed the memory transaction to output port 446) is discarded. In another implementation that address information is passed with the memory transaction to memory crossbar 412. Arbiter 906 asserts an ACKS signal that tells the input port 444 containing the chosen request station 812 that the memory transaction in that request station has been transmitted to memory crossbar 412.

Now an example operation of output port 446 in passing a result of a memory transaction from memory crossbar 412 to processor crossbar 408 will be described with reference to FIG. 9. For clarity it is assumed that all four of request stations 912 are valid. A request station 912 is valid when it currently stores a memory transaction that has not been sent to processor crossbar 408, and a TAGP and IDS retrieved from tag buffer 903.

As mentioned above, internal bus 442 includes 32 reverse data busses. Each request station 912 in each output port 446 is coupled to a different one of the 32 reverse data busses. In this way, the contents of all of the request stations 912 are presented on internal bus 442 simultaneously.

Some results, such as a result of a read transaction, include data. Other results, such as a result for a write transaction, include an acknowledgement but no data. For each result, queue controller 910 asserts a request REQX for one of input ports 444 based on IDS. As mentioned above, IDS indicates the input port 444 from which the memory transaction prompting the result originated. Queue controller 910 also asserts a valid signal VX for each request station 912 that currently stores a result ready for transmission to processor crossbar 408.

Each input port 444 chooses zero or one of the request stations 912 and transmits the result in that request station to processor crossbar 408, as described below. That input port 444 asserts a signal ACKX that tells the output port 446 which request station 912 within that output port was chosen. If one of the request stations 912 within output port 446 was chosen, queue controller 910 receives an ACKX signal. The ACKX signal indicates one of the request stations 912.

The request stations 912 within a queue 904 operate together substantially as a buffer. New results from processor crossbar 408 enter at request station 912A and progress towards request station 912D until chosen by an input port 444. For example, if an input port 444 chooses request station 912B, then request station 912B becomes invalid and therefore available for a new result from memory crossbar 412. However, rather than placing a new result in request station 912B, queue controller 910 moves the contents of request station 912A into request station 912B and places the new result in request station 912A. In this way, the identity of a request station 912 serves as an approximate indicator of the age of the result. In one implementation, only one new memory transaction can arrive during each transaction time, and each memory transaction can age by only one request station during each transaction time. In other implementations, age is computed in other ways.

When queue controller 910 receives an ACKX signal, it takes three actions. Queue controller 910 moves the contents of the "younger" request stations forward, as described above, changes the status of any empty request stations to invalid, and sends a POPA signal to segment interface 426. Segment interface 426 forwards the POPA signal across bus 422 to memory crossbar 412, thereby indicating that output port 446 can accept a new result from memory crossbar 412.

In response, memory crossbar 412 sends a new result, and a TAGS associated with that result, to the segment interface 426 of that output port 446. The generation of TAGS, and association of that TAGS with the result, are discussed below with reference to FIG. 10

Tag buffer 903 uses the received TAGS to retrieve the IDS and TAGP associated with that TAGS. TAGS is also returned to TAGS generator 902 for use in subsequent transmissions across bus 428.

Queue controller 910 stores the new result, the TAGP, and the IDS in request station 912A, and asserts signals VX and REQX for request station 912A. Signal VX indicates that request station 912A now has a result ready for transmission to processor crossbar 408. Signal REQX indicates through which input port 444 the result should pass.

Now an example operation of input port 444 in passing a result from an output port 446 to processor crossbar 408 will be described with reference to FIG. 8. Arbiter 806 receives a REQX signal and a VX signal indicating that a particular request station 912 within an output port 446 has a result ready for transmission to processor crossbar 408. The REQX signal identifies the request station 912, and therefore, the approximate age of the result within that request station 912. The VX signal indicates that the memory transaction within that request station 912 is valid. In general, arbiter 806 receives such signals from multiple request stations 912 and chooses the oldest request station 912 for transmission.

Arbiter 806 causes multiplexer 808 to gate the result and associated TAGP to segment interface 424, and to return the TAGP to TAGP generator 802 for use with future transmissions across bus 422. Arbiter 806 also asserts an ACKX signal that tells the output port 446 containing the chosen request station 912 that the result in that request station has been transmitted to processor crossbar 408.

Memory Crossbar

Figure 10:
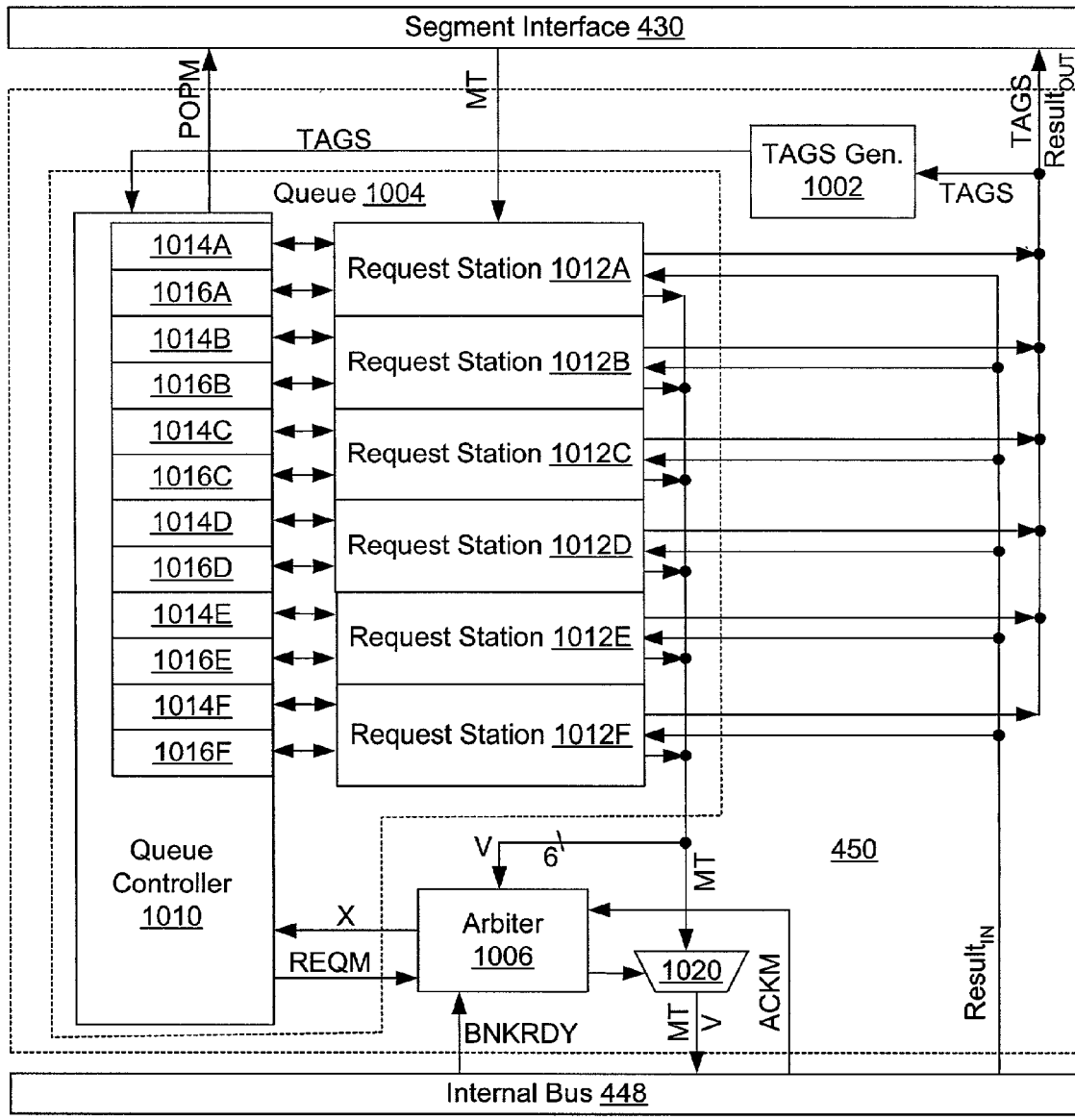
FIG. 10 shows an input port within a memory crossbar according to one implementation.

Referring to FIG. 10, an input port 450 within memory crossbar 412 is connected to a segment interface 430 and an internal bus 448, and includes a TAGS generator 1002, a queue 1004, an arbiter 1006, and multiplexer (MUX) 1020. TAGS generator 1002 can be implemented as described below. Segment interface 430 and arbiter 1006 can be implemented using conventional Boolean logic devices. Queue 1004 includes a queue controller 1010 and six request stations 1012A, 1012B, 1012C, 1012D, 1012E, and 1012F. Queue controller 1010 includes a forward controller 1014 and a reverse controller 1016 for each request station 1012. Forward controllers 1014 include forward controllers 1014A, 1014B, 1014C, 1014D, 1014E, and 1014F. Reverse controllers 1016 include forward controllers 1016A, 1016B, 1016C, 1016D, 1016E, and 1016F. Queue controller 1010, forward controllers 1014 and reverse controllers 1016 can be implemented using conventional Boolean logic devices.

Now an example operation of input port 450 in passing a memory transaction from switch crossbar 410 to a memory track 404 will be described with reference to FIG. 10. For clarity it is assumed that all six of request stations 1012 are valid. A request station 1012 is valid when it currently stores a memory transaction that has not been sent to a memory track 404, and a TAGS produced by TAGS generator 1002.

The request stations 1012 within a queue 1004 operate together substantially as a buffer. New memory transactions from switch crossbar 410 enter at request station 1012A and progress towards request station 1012F until chosen by an output port 452. For example, if an output port 452 chooses request station 1012B, then request station 1012B becomes invalid and therefore available for a memory transaction from switch crossbar 410. However, rather than placing a new memory transaction in request station 1012B, queue controller 1010 moves the contents of request station 1012A into request station 1012B and places the new memory transaction in request station 1012A. In this way, the identity of a request station serves as an approximate indicator of the age of the memory transaction. In one implementation, only one new memory transaction can arrive during each transaction time, and each memory transaction can age by only one request station during each transaction time. In other implementations, age is computed in other ways.

For each memory transaction, queue controller 1010 asserts a request REQM for one of output ports 552 based on a portion of the address in that memory transaction. Queue controller 1010 also asserts a valid signal V for each request station that currently stores a memory transaction ready for transmission to memory tracks 404.

Internal bus 442 includes 64 separate two-way private busses. Each private bus couples one input port 450 to one output port 452 so that each input port has a private bus with each output port.

Each arbiter 1006 includes eight pre-arbiters (one for each private bus). Each multiplexer 1020 includes eight pre-multiplexers (one for each private bus). Each pre-arbiter causes a pre-multiplexer to gate zero or one of the request stations 1012 to the private bus connected to that pre-multiplexer. In this way, an input port 450 can present up to six memory transactions on internal bus 448 simultaneously.

A pre-arbiter selects one of the request stations based on several criteria. The memory transaction must be valid. This information is given by the V signal. The memory transaction in the request station must be destined to the output port 452 served by the pre-arbiter. This information is given by the REQM signal. The memory bank addressed by the memory transaction must be ready to accept a memory transaction. The status of each memory bank is given by a BNKRDY signal generated by output ports 452, as described below. The pre-arbiter considers the age of each memory transaction as well. This information is given by the identity of the request station 1012.

Each output port 452 sees eight private data busses, each presenting zero or one memory transactions from an input port 450. Each output port 452 chooses zero or one of the memory transactions and transmits that memory transaction to memory controller 432, as described below. That output port 452 asserts a signal ACKM that tells the input port 450 which bus, and therefore which input port 450, was chosen. If one of the request stations 1012 within input port 450 was chosen, the pre-arbiter for that bus receives an ACKM signal. The ACKM signal tells the pre-arbiter that the memory transaction presented on the bus served by that pre-arbiter was transmitted to memory. The pre-arbiter remembers which request station 1012 stored that memory transaction, and sends a signal X to queue controller 1010 identifying that request station 1012.

Queue controller 1010 takes several actions when it receives a signal X. Queue controller 1010 moves the contents of the "younger" request stations forward, as described above, changes the status of any empty request stations to invalid by disasserting V, and moves the TAGS for the memory transaction just sent into a delay unit 1008.

Queue controller 1010 also sends a POPM signal to segment interface 430. Segment interface 430 forwards the POPM signal across bus 428 to switch crossbar 410, thereby indicating that input port 450 can accept a new memory transaction from switch crossbar 410.

In response, switch crossbar 410 sends a new memory transaction to the segment interface 430 of that input port 450. TAGS generator 1002 generates a TAGS for the memory transaction. TAGS generators 1002 and 902 are configured to independently generate the same tags in the same order, and are initialized to generate the same tags at substantially the same time, as discussed below. Therefore, the TAGS generated by TAGS generator 1002 for a memory transaction has the same value as the TAGS generated for that memory transaction by TAGS generator 902. Thus the tagging technique of this implementation allows a result returned from memory tracks 404 to be returned to the process that originated the memory transaction that produced that result.

Queue controller 1010 stores the new memory transaction and the TAGS in request station 1012A, and asserts signals V and REQM. Signal V indicates that request station 1012A now has a memory transaction ready for transmission to memory tracks 404. Signal REQM indicates through which input port 544 the result should pass.

Figure 11:
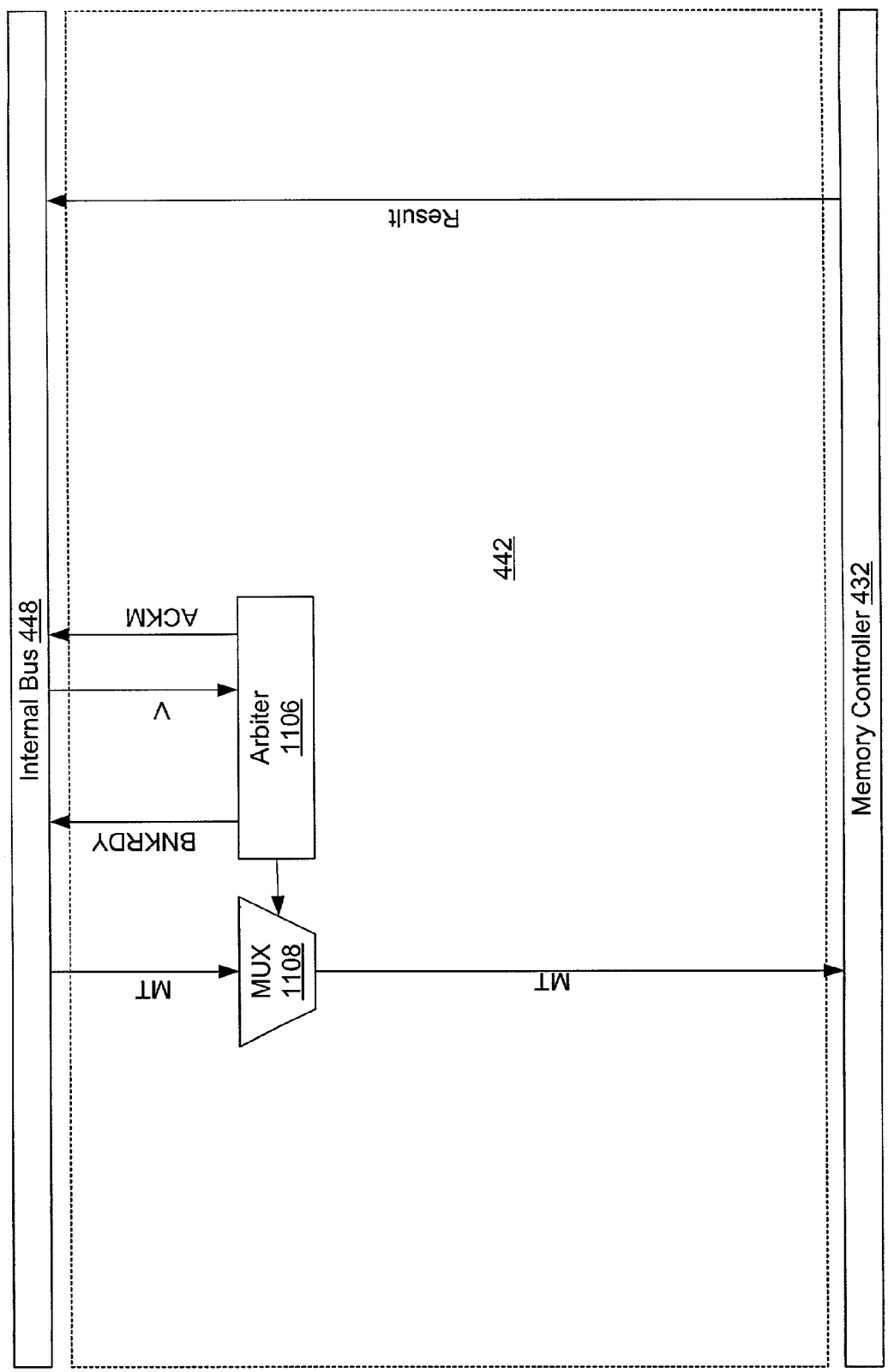
FIG. 11 shows an output port within a memory crossbar according to one implementation.

Referring to FIG. 11, an output port 452 within memory crossbar 412 includes a memory controller 432, an arbiter 1106, and a multiplexer 1108. Memory controller 432 and arbiter 1106 can be implemented using conventional Boolean logic devices.

Now an example operation of output port 452 in passing a memory transaction from an input port 450 to a memory track 404 will be described with reference to FIG. 11. Arbiter 1106 receives one or more signals V each indicating that a request station 1012 within an input port 450 has presented a memory transaction on its private bus with that output port 452 for transmission to memory tracks 404. The V signal indicates that the memory transaction within that request station 1012 is valid. In one implementation, arbiter 1106 receives such signals from multiple input ports 450 and chooses one of the input ports 450 based on a fairness scheme.

Arbiter 1106 causes multiplexer 1108 to gate the memory transaction presented by the chosen input port 450 to memory controller 432. Arbiter 1106 asserts an ACKM signal that tells the input port 450 containing the chosen request station 1012 that the memory transaction in that request station has been transmitted to memory tracks 404.

Now an example operation of output port 452 in passing a result of a memory transaction from memory tracks 404 to switch crossbar 410 will be described with reference to FIG. 11. When a result arrives at memory controller 432, memory controller 432 sends the result (Result$_{IN}$) over internal bus 448 to the input port 450 that transmitted the memory transaction that produced that result. Some results, such as a result of a read transaction, include data. Other results, such as a result for a write transaction, include an acknowledgement but no data.

Now an example operation of input port 450 in passing a result from an output port 452 to switch crossbar 410 will be described with reference to FIG. 10. Each result received over internal bus 448 is placed in the request station from which the corresponding memory transaction was sent. Each result and corresponding TAGS progress through queue 1004 towards request station 1012F until selected for transmission to switch crossbar 410.

Figure 12:
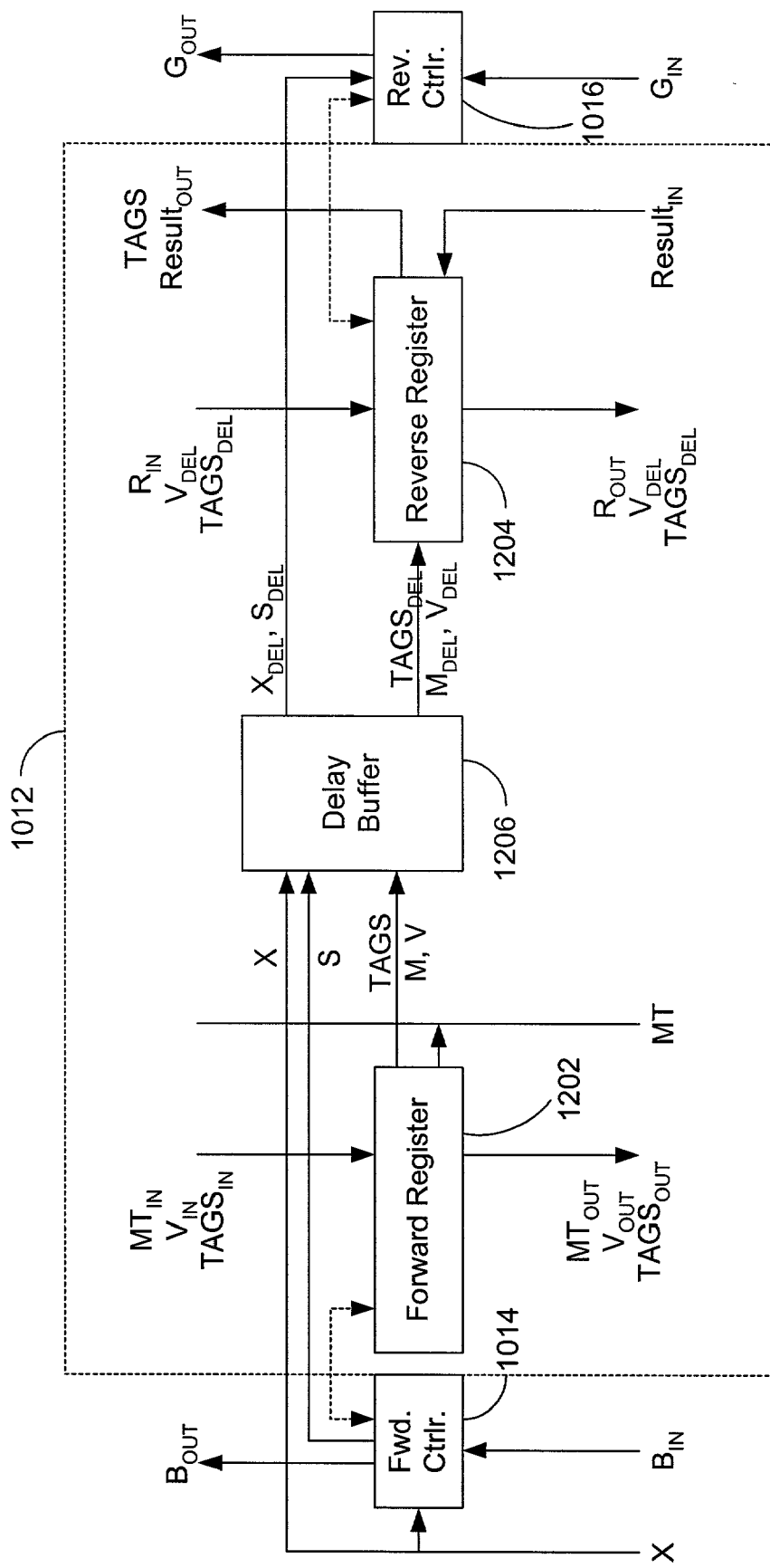
FIG. 12 depicts a request station according to one implementation.

FIG. 12 depicts a request station 1012 according to one implementation. Request station 1012 includes a forward register 1202, a reverse register 1204, and a delay buffer 1206. Forward register 1202 is controlled by a forward controller 1014. Reverse register 1204 is controlled by a reverse controller 1016.

Queue 1004 operates according to transaction cycles. A transaction cycle includes a predetermined number of clock cycles. Each transaction cycle queue 1004 may receive a new memory transaction (MT) from a switch crossbar 410. As described above, new memory transactions (MT) are received in request station 1012A, and age through queue 1004 each transaction cycle until selected by a signal X. Request station 1012A is referred to herein as the "youngest" request station, and includes the youngest forward and reverse controllers, the youngest forward and reverse registers, and the youngest delay buffer. Similarly, request station 1012F is referred to herein as the "oldest" request station, and includes the oldest forward and reverse controllers, the oldest forward and reverse registers, and the oldest delay buffer.

The youngest forward register receives new memory transactions ($MT_{IN}$) from switch crossbar 410. When a new memory transaction $MT_{IN}$ arrives in the youngest forward register, the youngest forward controller sets the validity bit $V_{IN}$ for the youngest forward register and places a tag TAGS from tag generator 1002 into the youngest forward register. In this description a bit is set by making it a logical one ("1") and cleared by making it a logical zero ("0").

When set, signal X indicates that the contents of forward register 1202 have been transmitted to a memory track 404.

Each forward controller 1014 generates a signal $B_{OUT}$ every transaction cycle where $$B_{OUT} = VB_{IN}\overline{X} \quad (1)$$

where $B_{OUT}$ is used by a younger forward register as $B_{IN}$ and $B_{IN}=0$ for the oldest forward register.

Each forward controller 1014 shifts into its forward register 1202 the contents of an immediately younger forward register when:

$$S=1 \quad (2)$$

where $$S=\overline{V}+X+\overline{B_{IN}} \quad (3)$$

where V indicates that the contents of the forward register 1202 are valid and X indicates that the memory transaction in that forward register 1202 has been placed on internal bus 448 by arbiter 1006. Note that X is only asserted for a forward register 1202 when that forward register is valid (that is, when the validity bit V is set for that forward register). The contents of each forward register include a memory transaction MT, a validity bit V, and a tag TAGS.

Referring to FIG. 12, the contents being shifted into forward register 1202 from an immediately younger forward register are denoted $MT_{IN}$, $V_{IN}$, and $TAGS_{IN}$, while the contents being shifted out of forward register 1202 to an immediately older forward register are denoted $MT_{OUT}$, $V_{OUT}$, and $TAGS_{OUT}$.

The validity bit V for each forward register 1202 is updated each transaction cycle according to $$V = V\overline{X} + SV_{IN} \quad (4)$$

Each forward controller 1014 copies TAGS, V, and M from its forward register 1202 into its delay buffer 1206 every transaction cycle. M is the address of the request station 1012. Each forward controller 1014 also copies X and S into its delay buffer 1206 every transaction cycle. Each delay buffer 1206 imposes a predetermined delay on its contents that is equal to the known predetermined time that elapses between sending a memory transaction to a memory track 404 and receiving a corresponding result from that memory track 404.

Each transaction cycle, an $X_{DEL}$, $V_{DEL}$, $S_{DEL}$, $M_{DEL}$, and $TAGS_{DEL}$ emerge from delay buffer 1306. $X_{DEL}$ is X delayed by delay buffer 1306. $V_{DEL}$ is V delayed by delay buffer 1306. $S_{DEL}$ is S delayed by delay buffer 1306. When $X_{DEL}$ is set, reverse register 1204 receives a result $Result_{IN}$ selected according to $M_{DEL}$ from a memory track 404, and a $TAGS_{DEL}$, $V_{DEL}$ and $S_{DEL}$ from delay buffer 1206, the known predetermined period of time after sending the corresponding memory transaction from forward register 1202 to that memory track 404. Each transaction cycle, reverse controller 1016 generates a signal $G_{OUT}$ where $$G_{OUT} = V_{DEL}G_{IN} \quad (5)$$

where $G_{OUT}$ is used by a younger reverse register as $G_{IN}$ and $G_{IN}=1$ for the oldest reverse register.

A reverse register 1204 sends its contents (a result $Result_{OUT}$ and a tag TAGS) to switch crossbar 410 when $$\overline{V_{DEL}}G_{IN}=1 \quad (6)$$

Each reverse controller 1016 shifts into its reverse register 1204 the contents of an immediately younger reverse register when:

$$S_{DEL}=1 \quad (7)$$

The contents of each reverse register include a result Result, a tag $TAGS_{DEL}$, and delayed validity bit $V_{DEL}$. Referring to FIG. 12, the result being shifted into reverse register 1204 from an immediately younger reverse register is denoted $R_{IN}$, while the result being shifted out of reverse register 1204 to an immediately older reverse register is denoted ROUT.

Memory Arbitration

Figure 13:
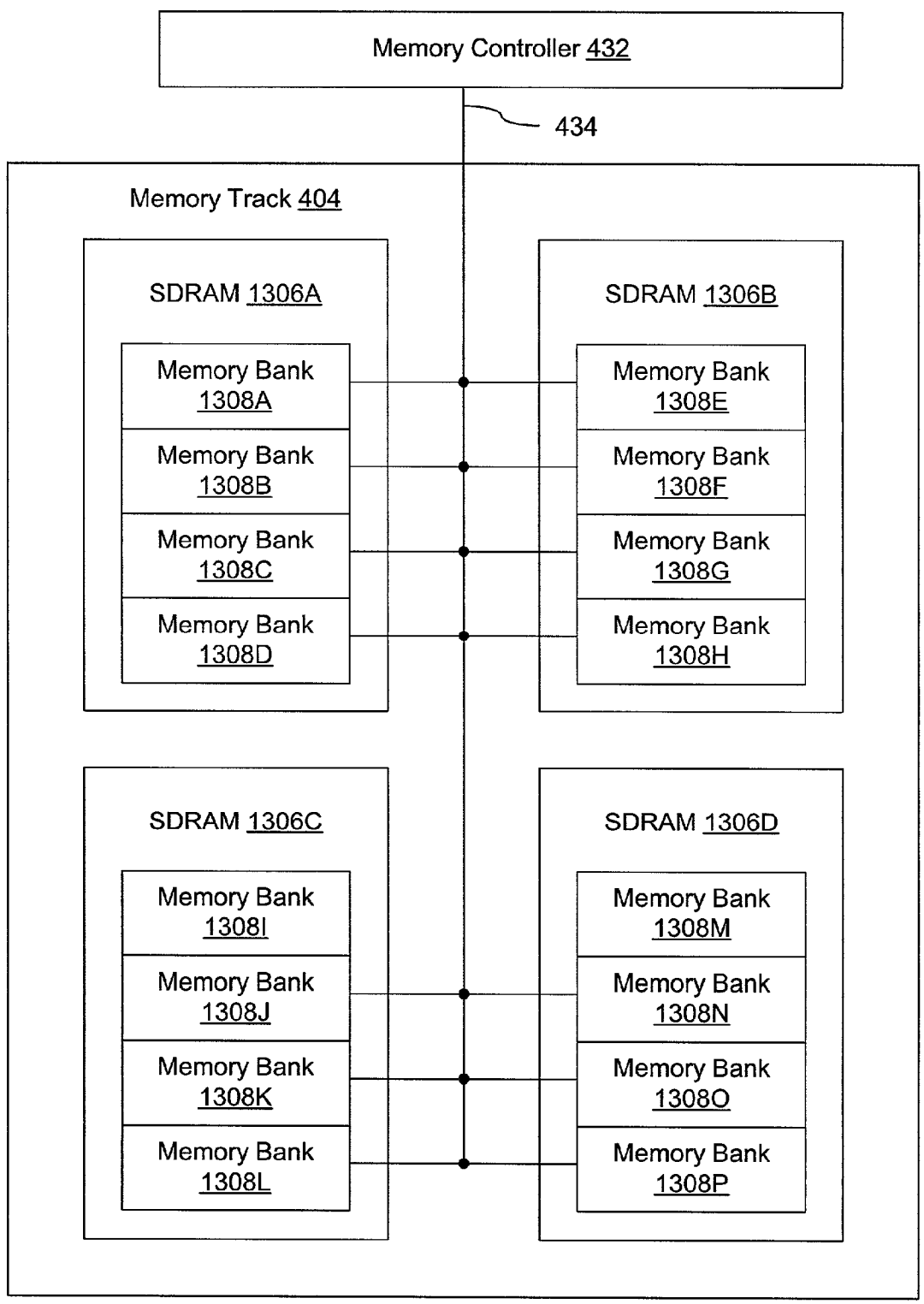
FIG. 13 depicts a memory track according to one implementation.

Each memory controller 432 controls a memory track 404 over a memory bus 434. Referring to FIG. 13, each memory track 404 includes four SDRAMs 1306A, 1306B, 1306C, and 1306D. Each SDRAM 1306 includes four memory banks 1308. SDRAM 1306A includes memory banks 1308A, 1308B, 1308C, and 1308D. SDRAM 1306B includes memory banks 1308E, 1308F, 1308G, and 1308H. SDRAM 1306C includes memory banks 1308I, 1308J, 1308K, and 1308L. SDRAM 1306D includes memory banks 1308M, 1308N, 13080, and 1308P.

The SDRAMs 1306 within a memory track 404 operate in pairs to provide a double-wide data word. For example, memory bank 1308A in SDRAM 1306A provides the least-significant bits of a data word, while memory bank 1308E in SDRAM 1306B provides the most-significant bits of that data word.

Memory controller 432 operates efficiently to extract the maximum bandwidth from memory track 404 by exploiting two features of SDRAM technology. First, the operations of the memory banks 1308 of a SDRAM 1306 can be interleaved in time to hide overhead such as precharge and access time. Second, the use of autoprecharge makes the command and data traffic equal. For an SDRAM, an eight-byte transfer operation requires two commands (activate and read/write) and two data transfers (four clock phases).

Figure 14:
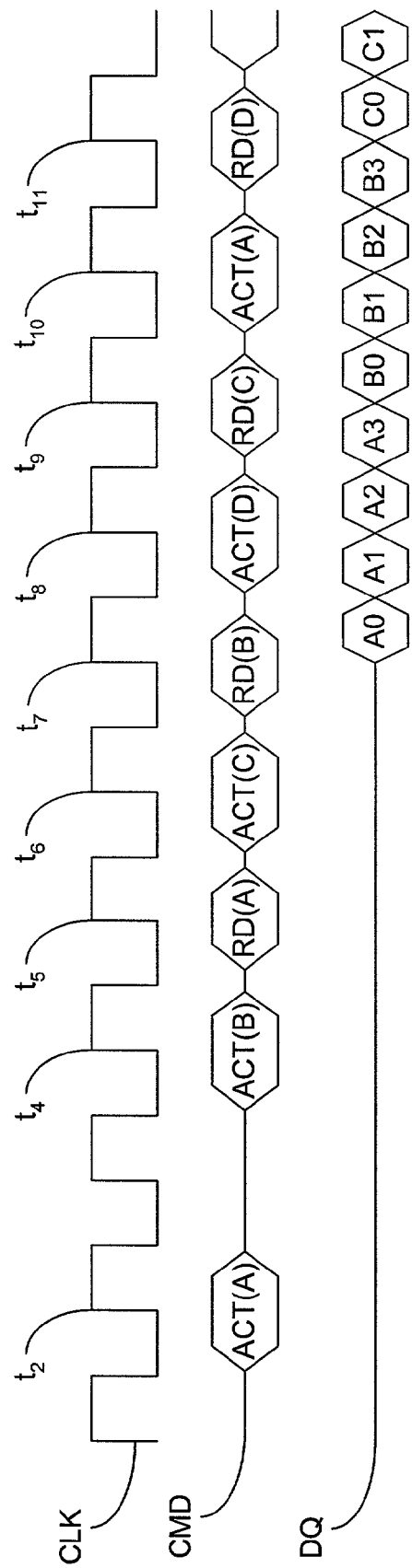
FIG. 14 depicts three timelines for an example operation of an SDRAM according to one implementation.

FIG. 14 depicts three timelines for an example operation of SDRAM 1306A. A clock signal CLK operates at a frequency compatible with SDRAM 1306A. A command bus CMD transports commands to SDRAM 1306A across memory bus 434. A data bus DQ transports data to and from SDRAM 1306A across memory bus 434.

FIG. 14 depicts the timing of four interleaved read transactions. The interleaving of other commands such as write commands will be apparent to one skilled in the relevant arts after reading this description. SDRAM 1306A receives an activation command ACT(A) at time $t_2$. The activation command prepares bank 1308A of SDRAM 1306A for a read operation. The receipt of the activation command also begins an eight-clock period during which bank 1308A is not available to accept another activation.

During this eight-clock period, SDRAM 1306A receives a read command RD(A) at $t_5$. SDRAM 1306A transmits the data A0, A1, A2, A3 requested by the read command during the two clock cycles between times $t_7$ and $t_9$. SDRAM 1306A receives another activation command ACT(A) at time $t_{10}$.

Three other read operations are interleaved with the read operation just described. SDRAM 1306A receives an activation command ACT(B) at time $t_4$. The activation command prepares bank 1308B of SDRAM 1306A for a read operation. The receipt of the activation command also begins an eight-clock period during which bank 1308B is not available to accept another activation.

During this eight-clock period, SDRAM 1306A receives a read command RD(B) at $t_7$. SDRAM 1306A transmits the data B0, B1, B2, B3 requested by the read command during the two clock cycles between times $t_9$ and $t_{11}$.

SDRAM 1306A receives an activation command ACT(C) at time $t_6$. The activation command prepares bank 1308C of SDRAM 1306A for a read operation. The receipt of the activation command also begins an eight-clock period during which bank 1308C is not available to accept another activation.

During this eight-clock period, SDRAM 1306A receives a read command RD(C) at $t_9$. SDRAM 1306A transmits the data C0, C1, and so forth, requested by the read command during the two clock cycles beginning with $t_{11}$.

SDRAM 1306A receives an activation command ACT(D) at time $t_8$. The activation command prepares bank 1308D of SDRAM 1306A for a read operation. The receipt of the activation command also begins an eight-clock period during which bank 1308D is not available to accept another activation.

During this eight-clock period, SDRAM 1306A receives a read command RD(D) at $t_{11}$. SDRAM 1306A transmits the data requested by the read command during two subsequent clock cycles in a manner similar to that describe above. As shown in FIG. 14, three of the eight memory banks 1308 of a memory track 404 are unavailable at any given time, while the other five memory banks 1308 are available.

Figure 15:
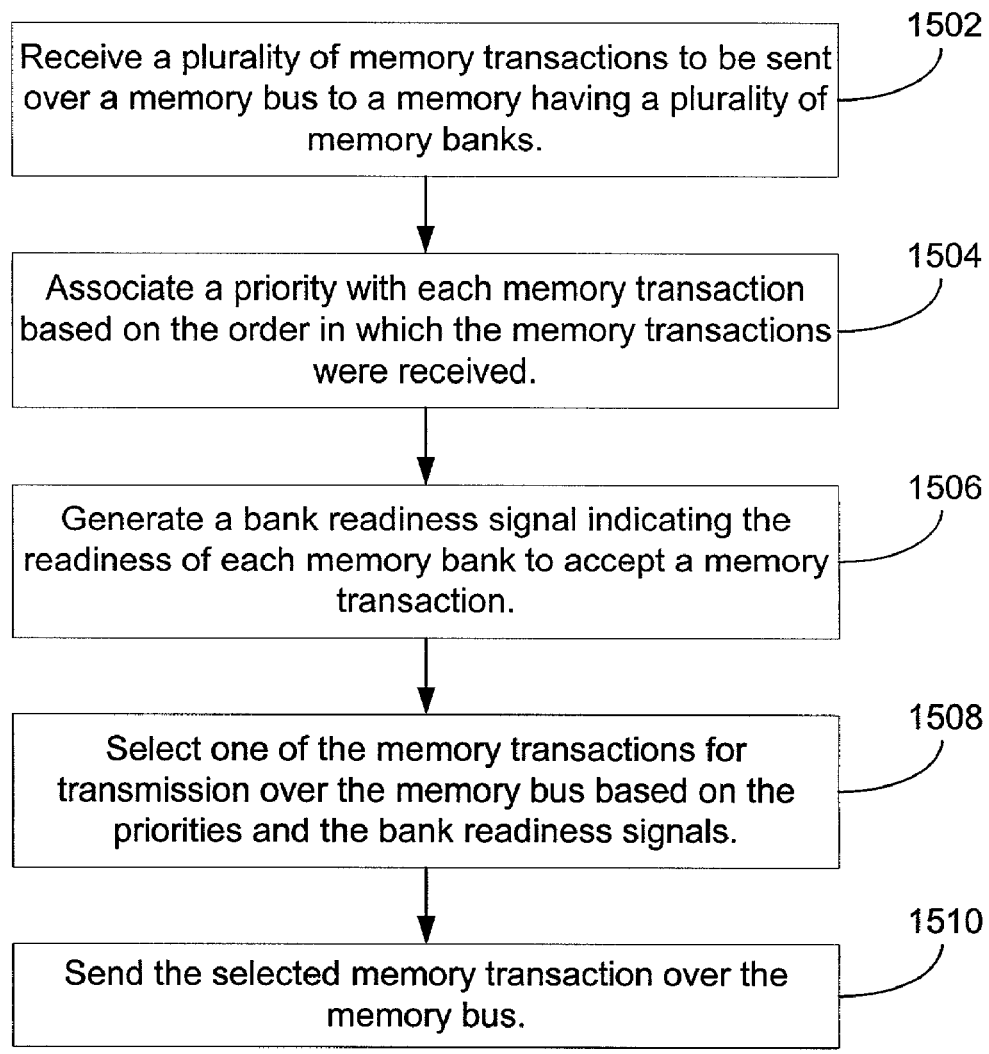
FIG. 15 is a flowchart depicting an example operation of a memory crossbar in sending memory transactions to a memory track based on the availability of memory banks within the memory track according to one implementation.

FIG. 15 is a flowchart depicting an example operation of memory crossbar 412 in sending memory transactions to a memory track 404 based on the availability of memory banks 1308. As described above, each input port 450 within memory crossbar 412 receives a plurality of memory transactions to be sent over a memory bus 434 to a memory track 404 having a plurality of memory banks 1308 (step 1502). Each memory transaction is addressed to one of the memory banks. However, each memory bus 434 is capable of transmitting only one memory transaction at a time.

Each input port 450 associates a priority with each memory transaction based on the order in which the memory transactions were received at that input port 450 (step 1504). In one implementation priorities are associated with memory transactions through the use of forward queue 1004 described above. As memory transactions age, they progress from the top of the queue (request station 1012A) towards the bottom of the queue (request station 1012F). The identity of the request station 1012 in which a memory transaction resides indicates the priority of the memory transaction. Thus the collection of the request stations 1012 within an input port 450 constitutes a set of priorities where each memory transaction has a different priority in the set of priorities.

Arbiter 1106 generates a signal BNKRDY for each request station 1012 based on the availability to accept a memory transaction of the memory bank 1108 to which the memory transaction within that request station 1012 is addressed (step 1506). Each BNKRDY signal tells the request station 1012 whether the memory bank 1308 to which its memory transaction is addressed is available.

Arbiter 1106 includes a state machine or the like that tracks the availability of memory banks 1308 by monitoring the addresses of the memory transactions gated to memory controller 432. When a memory transaction is sent to a memory bank 1308, arbiter 1106 clears the BNKRDY signal for that memory bank 1308, thereby indicating that that memory bank 1308 is not available to accept a memory transaction.

After a predetermined period of time has elapsed, arbiter 1106 sets the BNKRDY signal for that memory bank 1308, thereby indicating that that memory bank 1308 is available to accept a memory transaction.

As described above, the BNKRDY signal operates to filter the memory transactions within request stations 1012 so that only those memory transactions addressed to available memory banks 1308 are considered by arbiter 1006 for presentation on internal bus 448. Also as described above, arbiter 1106 selects one of the memory transactions presented on internal bus 448 using a fairness scheme. Thus memory crossbar 412 selects one of the memory transactions for transmission over memory bus 434 based on the priorities and the bank readiness signals (step 1508). Finally, memory crossbar 412 sends the selected memory transaction over memory bus 434 to memory tracks 404 (step 1510).

Tag Generator

As mentioned above, the pair of tag generators associated with a bus are configured to independently generate the same tags in the same order. For example, tag generators 702 and 802 are associated with bus 422, and tag generators 902 and 1002 are associated with bus 428.

In one implementation, the tag generators are buffers. The buffers are initialized by loading each buffer with a set of tags such that both buffers contain the same tags in the same order and no tag in the set is the same as any other tag in the set. In One implementation each buffer is a first-in, first-out (FIFO) buffer. In that implementation, tags are removed by "popping" them from the FIFO, and are returned by "pushing" them on to the FIFO.

In another implementation, each of the tag generators is a counter. The counters are initialized by setting both counters to the same value. Each tag is an output of the counter. In one implementation, the counter is incremented each time a tag is generated. If results return across a bus in the same order in which the corresponding memory transactions were sent across the bus, then the maximum count of the counter can be set to account for the maximum number of places (such as registers and the like) that a result sent across a bus and the corresponding memory transaction returning across the bus can reside.

However, if results do not return across a bus in the same order in which the corresponding memory transactions were sent across the bus, a control scheme is used. For example, each count can be checked to see whether it is still in use before generating a tag from that count. If the count is still in use, the counter is frozen (that is, not incremented) until that count is no longer in use. As another example, a count that is still in use can be skipped (that is, the counter is incremented but a tag is not generated from the count). Other such implementations are contemplated.

In another implementation, the counters are incremented continuously regardless of whether a tag is generated. In this way, each count represents a time stamp for the tag. The maximum count of each counter is set according to the maximum possible round trip time for a result and the corresponding memory transaction. In any of the counter implementations, the counters can be decremented rather than incremented.

Figure 16:
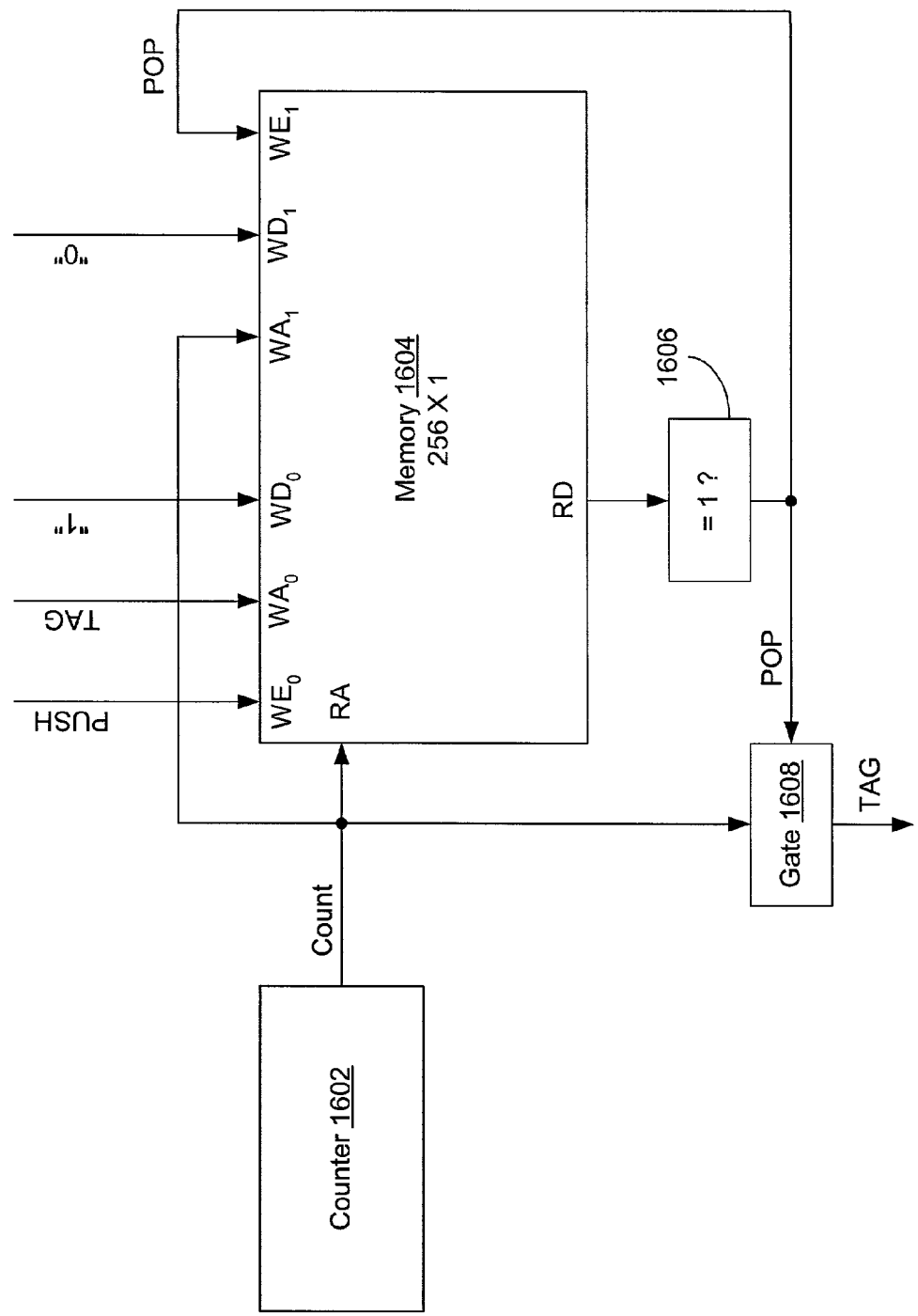
FIG. 16 depicts a tag generator according to one implementation.

In another implementation, depicted in FIG. 16, each of the tag generators includes a counter 1602 and a memory 1604. Memory 1604 is a two-port memory that is one bit wide. The depth of the memory is set according to design requirements, as would be apparent to one skilled in the relevant arts. The contents of memory 1604 are initialized to all ones before operation.

The read address (RA) of memory 1604 receives the count output of counter 1602. In this way, counter 1602 "sweeps" memory 1604. The data residing at each address is tested by a comparator 1606. A value of "1" indicates that the count is available for use as a tag. A value of "1" causes comparator 1606 to assert a POP signal. The POP signal causes gate 1608 to gate the count out of the tag generator for use as a tag. The POP signal is also presented at the write enable pin for port one (WE1) of memory 1604. The write data pin of port one (WD1) is hardwired to logic zero ("0"). The write address pins of port one receive the count. Thus when a free tag is encountered that tag is generated and marked "in-use."

When a tag is returned to the tag generator, its value is presented at the write address pins for port zero (WA0), and a PUSH signal is asserted at the write enable pin of port zero (WE0). The write data pin of port zero (WD0) is hardwired to logic one ("1"). Thus when a tag is returned to the tag generator, that tag is marked "free."

Figure 17:
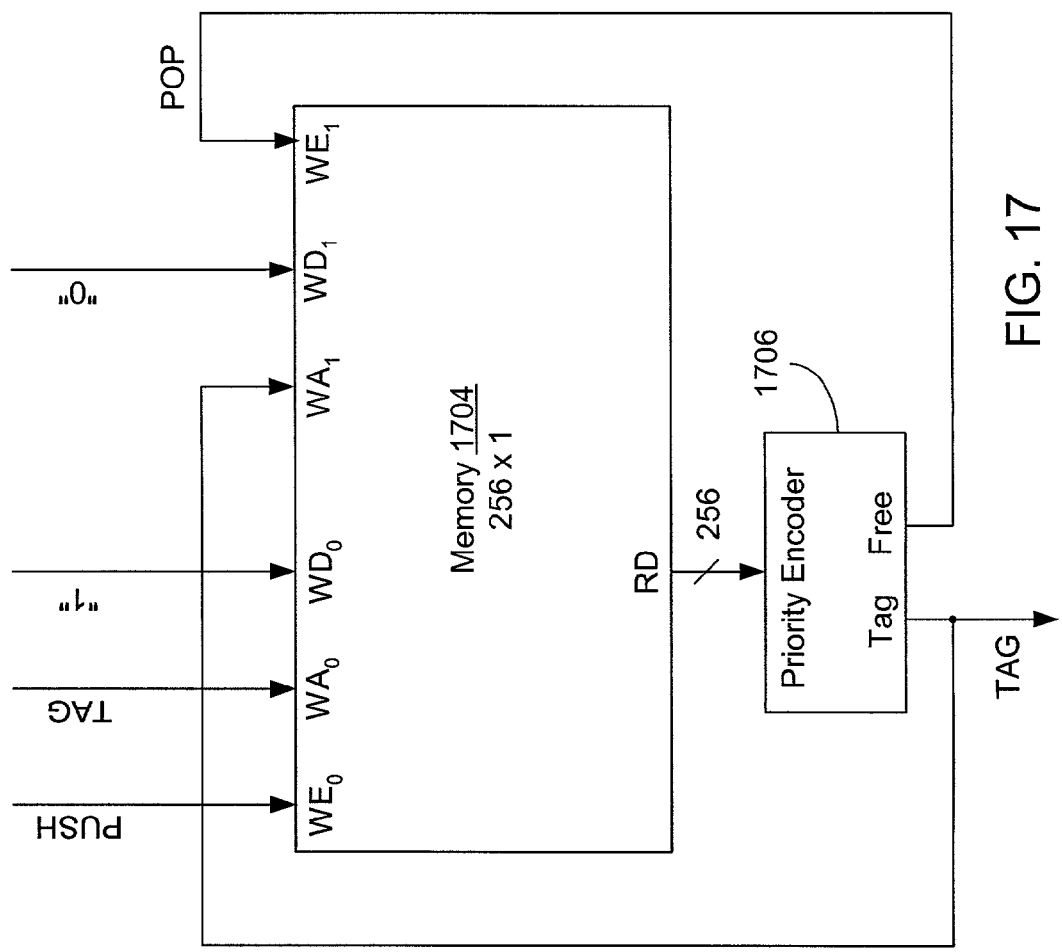
FIG. 17 depicts a tag generator according to another implementation.

In another implementation, shown in FIG. 17, comparator 1606 is replaced by a priority encoder 1806 that implements a binary truth table where each row represents the entire contents of a memory 1704. Memory 1704 writes single bits at two write ports $WD_0$ and $WD_1$, and reads 256 bits at a read port RD. Memory 1704 is initialized to all zeros. No counter is used.

One of the rows is all logic zeros, indicating that no tags are free. Each of the other rows contains a single logic one, each row having the logic one in a different bit position. Any bits more significant than the logic one are logic zeros, and any bits less significant than the logic one are "don't cares" ("X"). Such a truth table for a 1×4 memory is shown in Table 1.

TABLE 1

| RD | Free? | Tag |
|---|---|---|
| 0000 | No | none |
| 1XXX | Yes | 00 |
| 01XX | Yes | 01 |
| 001X | Yes | 10 |
| 0001 | Yes | 11 |

The read data from read port RD is applied to priority encoder 1806. If a tag is free, the output of priority encoder 1806 is used as the tag.

In the above-described implementations of the tag generator, a further initialization step is employed. A series of null operations (noops) is sent across each of busses 422 and 428. These noops do not cause the tag generators to generate tags. This ensures that when the first memory transaction is sent across a bus, the pair of tag generators associate with that bus generates the same tag for that memory transaction.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:

serially receiving, from a source, a plurality of forward messages each addressed to a corresponding destination among a plurality of destinations;

storing each forward message before attempting to send the forward message to its corresponding destination;

for each stored forward message, receiving an availability signal indicating whether its corresponding destination is available to accept the stored forward message before attempting to send the stored forward message to its corresponding destination;

for first stored forward messages whose corresponding first destinations are available, simultaneously sending the first stored forward messages to their corresponding first destinations, wherein a stored forward message is sent only to its corresponding destination and not until after receiving an availability signal indicating that the destination is available;

subsequent to sending the first stored forward messages, simultaneously receiving, after a predetermined period of time, a plurality of reverse messages from the first destinations, each reverse message corresponding to one of the first stored forward messages; and serially sending the reverse messages to the source.

2. The method of claim 1, wherein the source identifies each of the forward messages by a different tag, further comprising:

placing a tag in a delay buffer when sending to a destination the forward message identified by that tag, wherein the delay buffer implements a delay equal to the predetermined period of time such that the tag is available when receiving from the destination the reverse message corresponding to the forward message; and sending the tag to the source with the reverse message, whereby the source associates the reverse message with the forward message.

3. The method of claim 1, further comprising:
associating a priority with each forward message; and
sending a forward message to a destination when that forward message has a higher priority than other forward messages addressed to that destination.

4. The method of claim 3, wherein the priority of each forward message represents an age of that forward message.

5. The method of claim 1, further comprising:
associated a priority with each reverse message; and
sending a reverse message to the source when that reverse message has a higher priority than other reverse messages.

6. The method of claim 5, wherein the priority of each reverse message represents an age of that reverse message.

7. The method of claim 1, wherein each destination is a memory bank, each forward message is a memory transaction, and each reverse message is the result of one of the memory transaction.

8. A computer program product, tangibly stored on a computer-readable medium, comprising instructions operable to cause a programmable processor to:
serially receive, from a source, a plurality of forward messages each addressed to a corresponding destination among a plurality of destinations;
store each forward message before attempting to send the forward message to its corresponding destination;
receive an availability signal for each stored forward message indicating whether its corresponding destination is available to accept the stored forward message before attempting to send the stored forward message to its corresponding destination;
for first stored forward messages whose corresponding first destinations are available, simultaneously send the first stored forward messages to their corresponding first destinations, wherein a stored forward message is sent only to its corresponding destination and not until after receiving an availability signal indicating that the destination is available;
simultaneously receive, after a predetermined period of time, a plurality of reverse messages from the first destinations, each reverse message corresponding to one of the first stored forward messages; and
serially send the reverse messages to the source.

9. The computer program product of claim 8, wherein the source identifies each of the forward messages by a different tag, further comprising instructions operable to cause a programmable processor to:
place a tag in a delay buffer when sending to a destination the forward message identified by that tag, wherein the delay buffer implements a delay equal to the predetermined period of time such that the tag is available when receiving from the destination the reverse message corresponding to the forward message; and
send the tag to the source with the reverse message, whereby the source associates the reverse message with the forward message.

10. The computer program product of claim 8, further comprising instructions operable to cause a programmable processor to:
associate a priority with each forward message; and
send a forward message to a destination when that forward message has a higher priority than other forward messages addressed to that destination.

11. The computer program product of claim 10, wherein the priority of each forward message represents an age of that forward message.

12. The computer program product of claim 8, further comprising instructions operable to cause a programmable processor to:
associate a priority with each reverse message; and
send a reverse message to the source when that reverse message has a higher priority than other reverse messages.

13. The computer program product of claim 12, wherein the priority of each reverse message represents an age of that reverse message.

14. The computer program product of claim 8, wherein each destination is a memory bank, each forward message is a memory transaction, and each reverse message is the result of one of the memory transactions.

* * * * *